United States Patent
Ye et al.

(10) Patent No.: US 10,281,935 B2
(45) Date of Patent: May 7, 2019

(54) FLUID MIXING VALVE

(71) Applicant: XIAMEN LOTA INTERNATIONAL CO., LTD., Fujian (CN)

(72) Inventors: Liming Ye, Fujian (CN); Jianping Zhou, Fujian (CN); Junhao Xu, Fujian (CN); Shuanglin Bai, Fujian (CN)

(73) Assignee: XIAMEN LOTA INTERNATIONAL CO., LTD, Fujian Province (CN)

( * ) Notice: Subject to any disclaimer, the term of this patent is extended or adjusted under 35 U.S.C. 154(b) by 0 days.

(21) Appl. No.: 15/359,062

(22) Filed: Nov. 22, 2016

(65) Prior Publication Data

US 2017/0168510 A1    Jun. 15, 2017

(30) Foreign Application Priority Data

Nov. 27, 2015  (CN) .......................... 2015 1 0845028

(51) Int. Cl.
   *G05D 7/01*   (2006.01)
   *G05D 23/13*  (2006.01)
   *G05D 16/10*  (2006.01)

(52) U.S. Cl.
   CPC ........... *G05D 23/1313* (2013.01); *G05D 7/01* (2013.01); *G05D 16/106* (2013.01)

(58) Field of Classification Search
   USPC ........ 236/12.12, 12.15, 12.16, 12.23; 137/98
   See application file for complete search history.

(56) References Cited

U.S. PATENT DOCUMENTS

| | | | |
|---|---|---|---|
| 4,901,750 A | 2/1990 | Nicklas et al. | |
| 5,067,513 A * | 11/1991 | Nicklas .............. | G05D 23/1353 137/454.6 |
| 5,445,181 A * | 8/1995 | Kuhn .................. | F16K 11/0782 137/98 |
| 5,664,598 A * | 9/1997 | Shieh ...................... | E03C 1/041 137/100 |
| 7,845,574 B2 * | 12/2010 | Mace .................... | F16K 31/002 137/625.17 |
| 7,918,241 B1 * | 4/2011 | Chang .................. | F16K 11/074 137/315.09 |
| 8,375,974 B2 * | 2/2013 | Yan ..................... | F16K 11/0743 137/100 |
| 9,416,884 B2 | 8/2016 | Niver | |

(Continued)

FOREIGN PATENT DOCUMENTS

CN            104048076 A      9/2014

OTHER PUBLICATIONS

English Translation to Abstract for CN104048076.

*Primary Examiner* — John Fox
(74) *Attorney, Agent, or Firm* — Cantor Colburn LLP

(57) ABSTRACT

In the disclosure a fluid mixing valve for mixing a first fluid and a second fluid is provided, comprising: a housing; a balance valve module for balancing pressure between the first fluid and the second fluid, comprising a first fluid inlet, a second fluid inlet, a first fluid outlet in fluid communication with the first fluid inlet, and a second fluid outlet in fluid communication with the second fluid inlet; an adjustable valve module disposed on the balance valve module, comprising an inner casing member, flow-rate adjustment seat secured to the inner casing member, and a temperature adjustment shaft received in the inner casing member; and a mixed fluid discharging passage.

17 Claims, 18 Drawing Sheets

(56) References Cited

U.S. PATENT DOCUMENTS

| | | |
|---|---|---|
| 2007/0119501 A1 | 5/2007 | Pinette |
| 2011/0266355 A1 | 11/2011 | Yang |
| 2012/0222763 A1 | 9/2012 | Yang |
| 2015/0144214 A1* | 5/2015 | Chang .................... F16K 11/02 137/625.41 |

* cited by examiner

Section A-A

Section B-B

Section C-C

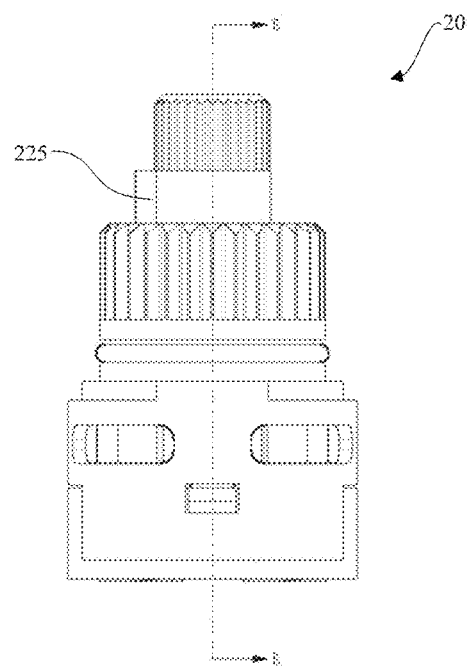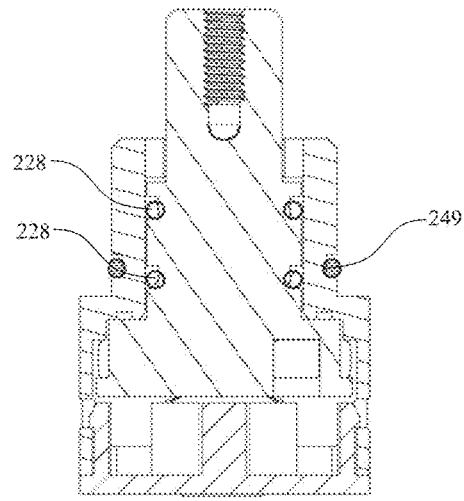
Fig. 11A　　　　　　　　　　　Fig. 11B
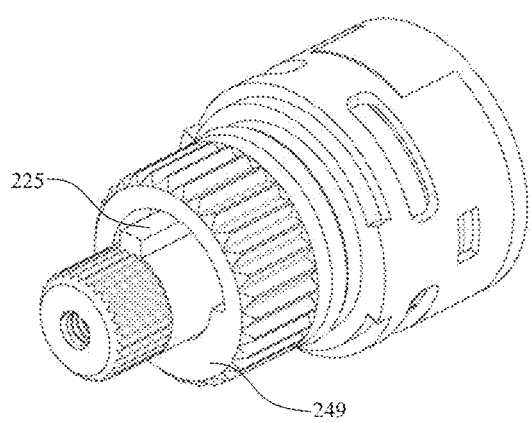
Fig. 11C

Section F-F

Section F-F, after rotation of the temperature adjustment shaft

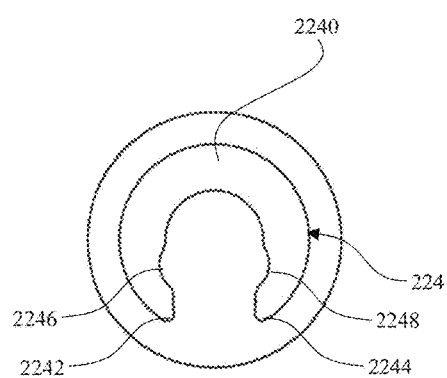
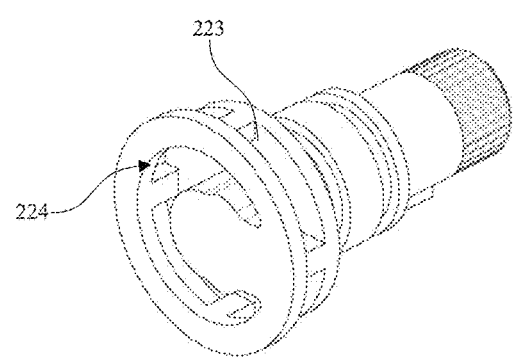
Fig. 14A
Fig. 14B

FLUID MIXING VALVE

CROSS-REFERENCE TO RELATED APPLICATIONS

This application claims foreign priority under 35 U.S.C. § 119 to Chinese Patent Application No. 201510845028.X filed on Nov. 27, 2015, the entire contents of which are incorporated herein by reference thereto.

TECHNICAL FIELD

The disclosure relates to the field of valve, in particular to fluid mixing valve, and more particularly to fluid mixing valve for shower system.

BACKGROUND

The mixing valve is known to be used in bathroom or washroom to mix a cold water and a hot water and to regulate a mixing ratio (and thus a water temperature) and a flow rate of the cold and hot waters. In general, the fluid mixing valve is operated by rotating the handle of the mixing valve in a range of two end positions of the fluid mixing valve, i.e., between a closing position, in which no water flows out of the mixing valve, and a hot-water maximum position, in which the water has a highest water temperature and a maximum flow rate.

Various developments have been made to the fluid mixing valve in the art.

U.S. Pat. No. 4,901,750A relates to a mixing valve having a modular cartridge rotatably mounted in a housing. The cartridge has a bottom volume control valve plate attached to a lower section housing a pressure balance valve. The lower section is secured to an upper section that rotatably receives a temperature control plate. The bottom volume control valve plate and the temperature control plate are both rotatable about a common axis. The valve plate is controlled by operation of a stem attached to a handle. The temperature control plate is controlled by operation of a knob. An insert allows the knob to be operated even if hot and cold water supplies are inverted. A splined hot-water stop ring sits in handle and is adapted to limit rotation of knob for a selected maximum water temperature. External seals assure that all water flows through cartridge when the volume is set for partial flow.

US Patent Application Publication US2007/0119501A1 relates to a valve for balancing pressure between a first fluid and a second fluid. The valve comprises a valve body including a first fluid inlet for receiving the first fluid, a second fluid inlet for receiving the second fluid, a first fluid outlet, a second fluid outlet, and an internal chamber in fluid communication with the first fluid inlet, the second fluid inlet, the first fluid outlet, and the second fluid outlet. The valve further comprises a first valve member molded from a polymer and positioned within the chamber, the first valve member having an inner surface defining an internal passage in fluid communication with the first fluid inlet, the second fluid inlet, the first fluid outlet, and the second fluid outlet. The valve further comprises a second valve member at least partially disposed within the internal passage of the first valve member and slidably moveable relative to the first valve member, the second valve member having an outer surface, a first fluid channel in fluid communication with the first fluid inlet and the first fluid outlet, a second fluid channel separated from the first fluid channel and in fluid communication with the second fluid inlet and the second fluid outlet. The outer surface of the second valve member and the inner surface of the first valve member are machined to have substantially the same dimensions to provide a movable seal between the second valve member and the first valve member. Moreover, the first valve member includes a plurality of apertures and the second valve member includes a plurality of apertures, wherein the apertures of the first valve member and the second valve member can be selectively aligned to each other to control the water flow to the first and second fluid outlets.

US Patent Application Publication US20110266355A1 relates to a water mixer for a faucet, comprising a shell having a transversal plate, which has a first plane and a second plane, a first chamber being defined between the first plane and the shell, a second chamber and a third chamber being defined between the second plane and the shell, the transversal plate being formed with a first passage and a second passage, both of which communicate the first chamber with the second chamber, the third chamber being isolated from the second chamber and being in communication with the first chamber. The mixer further comprises a balance member, comprising a first tube unit, a second tube unit and a pressure balancer, the tube units being disposed in the second chamber, the first tube unit having a through hole in communication with the first passage, and the second tube unit having a through hole in communication with the second passage, each tube unit having a lateral bore in communication with the through holes thereof, respectively. The lateral bores of the tube units face to each other and a receiving space, in which the pressure balancer is movably disposed, is defined between the lateral bores. The mixer further comprises a mixing element, which is disposed in the first chamber and is adapted to regulate the water entering into the first chamber via the first and second passages and to regulate the water flowing to the third chamber from the first chamber. The mixer further comprises an adjustment element, which is connected to the mixing element and is adapted to control movement of the mixing element so as to adjust a mixing ratio of a flow rate in the first passage to a flow rate in the second passage.

US Patent Application Publication US20120222763A relates to a faucet valve, comprising a shell having a side wall and a partition, the side wall being disposed around the partition, the side wall and the partition defining a first room, the partition being formed with a groove, the partition separating the groove and the first room, the partition being formed with a first opening and a second opening which are in communication with the first room with the groove respectively, and the shell being formed with an outlet which is in communication with the first room. The faucet valve further comprises a bottom cover fixed to the shell and formed with a recess which, together with the groove, form a second room. The bottom cover is formed with a first flow hole and a second flow hole, which respectively communicate the second room with an external space. The faucet valve further comprises a pressure valve received in the second room so as to separate the first flow hole and the second flow hole. The first flow hole and the first opening define a first channel for water to flow from external space through the first channel and then entering into the first room, and the second flow hole and the second opening define a second channel for water to flow from external space through the second channel and then entering into the first room. The pressure valve has a valve tube which is movable under a water pressure, such that the size of the first channel and the second channel is adjustable. The faucet valve further comprises a mix valve received in the first room, such that the water flows from the first opening and the second opening into the first room, and then to the outlet. The faucet valve further comprises a control head connected to the mix valve so as to control the amount of water flowing from the first opening and the second opening, respectively, into the first room.

Chinese Patent Application Publication CN104048076A relates to a concentric cartridge for fluid mixing valve, including an inlet connection configured to receive a first fluid and a second fluid, a pressure balance unit, a volume control plate rotatably coupled to the pressure balance unit and positioned between the inlet connection and the pressure balance unit, a temperature control plate, and a mixing plate positioned between the pressure balance unit and the temperature control plate. The pressure balance unit and the volume control plate are rotatable relative to the inlet connection and the temperature control plate is rotatable relative to the mixing plate. The mixing plate has an irregularly shaped opening configured to mix fluids with different temperatures such that the temperature of the mixed fluid increases linearly as function of rotational angle of a temperature control handle.

Nevertheless, there is still a need to provide a fluid mixing valve that is able to realize independent temperature and flow rate adjustments with a simple construction.

SUMMARY OF THE INVENTION

Therefore, an object of the disclosure lies in providing an improved flow-rate adjustable valve.

According to an aspect of the disclosure, a fluid mixing valve for mixing a first fluid and a second fluid is provided, comprising: a housing; a balance valve module for balancing pressure between the first fluid and the second fluid, comprising a first fluid inlet, a second fluid inlet, a first fluid outlet in fluid communication with the first fluid inlet, and a second fluid outlet in fluid communication with the second fluid inlet; an adjustable valve module disposed on the balance valve module, comprising an inner casing member, a flow-rate adjustment seat secured to the inner casing member, and a temperature adjustment shaft received in the inner casing member; and a mixed fluid discharging passage; wherein the flow-rate adjustment seat comprises a first hole configured to be selectively in fluid communication with the first fluid outlet and a second hole configured to be selectively in fluid communication with the second fluid outlet; and wherein the temperature adjustment shaft comprises an adjustable valve plate defining an adjustment aperture, and a mixing chamber in fluid communication with the mixed fluid discharging passage. Preferably, the temperature adjustment shaft is configured to be operated to be rotated in relation to the inner casing member and the flow-rate adjustment seat so as to adjust a ratio of the first fluid to the second fluid flowing through the adjustment aperture. Preferably, the inner casing member is configured to be operated to drive the flow-rate adjustment seat and the temperature adjustment shaft for rotation therewith in relation to the balance valve module so as to adjust a flow rate of the fluid from the first fluid outlet through the first hole and a flow rate of the fluid from the second fluid outlet through the second hole.

This fluid mixing valve according to the invention has simple structure with less components, especially movable components, and is easy to be assembled, while independent adjustments to temperature and flow rate are realized with a desired effect of sealing maintained.

According to an embodiment of the invention, the housing has a housing hole at a top thereof. Preferably, the inner casing member is configured to extend out from the housing hole. Preferably, the inner casing member at a top thereof has an inner casing hole, from which the temperature adjustment shaft is configured to extend out. Preferably, the inner casing member at a portion extending out from the housing hole comprises a first mounting portion or a manipulation portion and the temperature adjustment shaft at a portion extending out from the inner casing hole comprises a second mounting portion or a manipulation portion.

According to an embodiment of the invention, the inner casing hole of the inner casing member defines a stop portion having a first stop surface and a second stop surface, and a limit groove, and the temperature adjustment shaft comprises a protruding block configured to be movable within the limit groove between the first stop surface and the second stop surface.

According to an embodiment of the invention, the housing at inner side thereof has a first stop portion and a second stop portion opposed to each other, and the inner casing member at outer side thereof has a first stopper and a second stopper opposed to each other and configured to be movable between the first stop portion and the second stop portion respectively.

According to an embodiment of the invention, the temperature adjustment shaft further comprises an upper valve plate spaced from the adjustable valve plate and a lateral opening, the mixing chamber is defined between the adjustable valve plate and the upper valve plate, and the lateral opening is configured to communicate the mixing chamber with the mixed fluid discharging passage.

According to an embodiment of the invention, the adjustable valve plate is in the form of a separate component made of ceramic. One of the adjustable valve plate and the upper valve plate has a plurality of recesses and from the other of the adjustable valve plate and the upper valve plate extend longitudinally a plurality of protrusions which are received in respective recesses.

Preferably, the temperature adjustment shaft comprises a shaft body having a hollow inner chamber.

According to an embodiment of the invention, the inner casing member comprises a snap-fit opening, and the flow-rate adjustment seat comprises a snap-fit member or a tab for snap-fitting into the snap-fit opening.

According to an embodiment of the invention, the flow-rate adjustment seat comprises a unitary ceramic flow-rate adjustment seat, and the adjustable valve plate is configured to be directly supported on the flow-rate adjustment seat.

According to an embodiment of the invention, arranged between the housing and the inner casing member is at least one first sealing element. Preferably, the temperature adjustment shaft comprises at least one annular groove and at least one second sealing element is arranged in the annular groove and located between the temperature adjustment shaft and the inner casing member. Preferably, the first sealing element is configured to apply friction force to the inner casing member to prevent the inner casing member from rotation, when the temperature adjustment shaft is rotated in relation to the inner casing member. Preferably, the second sealing element is configured to apply friction force to the temperature adjustment shaft to allow the temperature adjustment shaft to be rotated along with the inner casing member, when the inner casing member is rotated in relation to the balance valve module.

According to an embodiment of the invention, the adjustable valve plate defines a single adjustment aperture. Preferably, the single adjustment aperture has a generally arc shape and defines an intermediate portion, a first end and a second end. Preferably, the adjustment aperture is wider at the intermediate portion, and tapers towards the first end and the second end respectively.

According to an embodiment of the invention, the balance valve module comprises: a first balance valve casing defining the first fluid inlet, the first fluid outlet, a first balance chamber between the first fluid inlet and the first fluid outlet, and a first lateral opening in communication with the first balance chamber; a second balance valve casing defining the second fluid inlet, the second fluid outlet, a second balance chamber between the second fluid inlet and the second fluid outlet, and a second lateral opening in communication with the second balance chamber and opposed to the first lateral opening; a valve spool subassembly arranged in the first and second lateral openings and comprising an outer balance valve spool having an outer spool bore and a peripheral opening, and an inner balance valve spool having a first inner spool bore, a second inner spool bore, a partition wall for separating the first and second inner spool bores from each other, and a peripheral opening; a first check valve received in the first fluid inlet; and a second check valve received in the second fluid inlet.

According to an embodiment of the invention, the balance valve module further comprises a fastener for fastening the first balance valve casing and the second balance valve casing to each other, a first snap-fit projection positioned on the first balance valve casing, and a second snap-fit projection positioned on the second balance valve casing, and wherein the housing comprises a pair of hooks for snap-fitting to the first and second snap-fit projections.

According to an embodiment of the invention, the fluid mixing valve further comprises a unitary ceramic spacer having a first passage, a second passage, a first flange surrounding the first passage and extending into the first fluid outlet, and a second flange surrounding the second passage and extending into the second fluid outlet.

According to a second aspect of the invention, a fluid mixing valve for mixing a first fluid and a second fluid is provided, comprising: a housing; a balance valve module for balancing pressure between the first fluid and the second fluid, comprising a first fluid inlet, a second fluid inlet, a first fluid outlet in fluid communication with the first fluid inlet, and a second fluid outlet in fluid communication with the second fluid inlet; an adjustable valve module disposed on the balance valve module, comprising a rotatably mounted temperature adjustment shaft; and a mixed fluid discharging passage. The temperature adjustment shaft comprises an adjustable valve plate defining a single adjustment aperture, and a mixing chamber in fluid communication with the mixed fluid discharging passage. Preferably, the single adjustment aperture has a generally arc shape and defines an intermediate portion, a first end and a second end. Preferably, the adjustment aperture is wider at the intermediate portion, and tapers towards the first end and the second end. This configuration may be advantageous in realizing wide temperature adjustment range and high temperature accuracy.

According to an embodiment of the invention, the adjustment aperture has a bugle adjacent to the first end and the second end on a side wall thereof.

According to an embodiment of the invention, the adjustable valve module further comprises a rotatably mounted inner casing member for receiving the temperature adjustment shaft, and a flow-rate adjustment seat secured to the inner casing member.

According to a third aspect of the invention, a fluid mixing valve for mixing a first fluid and a second fluid is provided, comprising: a housing; a balance valve module for balancing pressure between the first fluid and the second fluid, comprising a first fluid inlet, a second fluid inlet, a first fluid outlet in fluid communication with the first fluid inlet, and a second fluid outlet in fluid communication with the second fluid inlet; a first valve face located downstream of the balance valve module, comprising a first hole and a second hole, the first valve face being configured to be operated to be rotated in relation to the balance valve module so as to adjust the flow rate of the fluid from the first fluid outlet through the first hole and the flow rate of the fluid from the second fluid outlet through the second hole; a second valve face located downstream of the first valve face, the second valve face defining an adjustment aperture and being configured to be operated to be rotated in relation to the first valve face so as to adjust the ratio of the first fluid to the second fluid flowing through the adjustment aperture; a mixing chamber located downstream of the second valve face; a mixed fluid discharging passage in fluid communication with the mixing chamber; a first friction generating means; and a second friction generating means; wherein the first friction generating means is configured to apply friction force to the first valve face so as to prevent the first valve face from rotation, when the second valve face is rotated in relation to the first valve face; wherein the second friction generating means is configured to apply friction force to the second valve face so as to allow the second valve face to be rotated along with the first valve face, when the first valve face is rotated in relation to the balance valve module.

This fluid mixing valve according to the invention has simple structure with less components, especially movable components, and is easy to be assembled, while independent adjustments to temperature and flow rate are realized with a desired effect of sealing maintained. Moreover, independent adjustments can be realized by proper regulation of the friction forces.

According to an embodiment of the invention, the fluid mixing valve further comprises an adjustable valve module, which comprises a rotatably mounted inner casing member, a flow-rate adjustment seat secured to the inner casing member and a temperature adjustment shaft rotatably received in the inner casing member; wherein the flow-rate adjustment seat defines the first valve face and the temperature adjustment shaft defines the second valve face.

According to an embodiment of the invention, the first sealing means comprises at least one first sealing element arranged between the housing and the inner casing member, and the second sealing means comprises at least one second sealing element arranged between the temperature adjustment shaft and the inner casing member.

According to another aspect of the invention, a shower system having the fluid mixing valve is provided.

According to another aspect of the invention, a method for assembling the fluid mixing valve is provided.

Part of further features and advantages of the disclosure will be apparent to the skilled in the art after reading the disclosure, the other part will be described in the following detailed description in relation with the accompanying drawings.

BRIEF DESCRIPTION OF DRAWINGS

The embodiments of the invention will be described in detail with reference to the drawings, in which:

FIG. 11A shows a plan view of the adjustable valve module of the flow-rate control valve in accordance with the embodiment of the invention;

FIG. 11B shows a sectional view through the E-E line in FIG. 11A;

FIG. 11C shows a perspective view of the adjustable valve module as illustrated in FIG. 11A;

FIG. 14A shows a bottom view of the adjustment shaft of the adjustable valve module of flow-rate adjustable valve in accordance with the embodiment of the invention, with the adjustment aperture depicted;

FIG. 14B shows a perspective view of the adjustment shaft of the adjustable valve module of flow-rate adjustable valve in accordance with the embodiment of the invention;

Identical or similar reference numerals represent identical or similar features throughout the disclosure.

DETAILED DESCRIPTION

For better understanding of the features, objects and effects of the disclosure, exemplary embodiments of the invention will be described with reference to the drawings. Although the figures are provided to represent some embodiments of the invention, the drawings are not required to be drawn in scale, and some features may be enlarged, removed or cross-sectioned to better illustrate the disclosure of the invention. The term "in figures" or the like does not necessarily refer to all the figures or examples.

Figure 1:
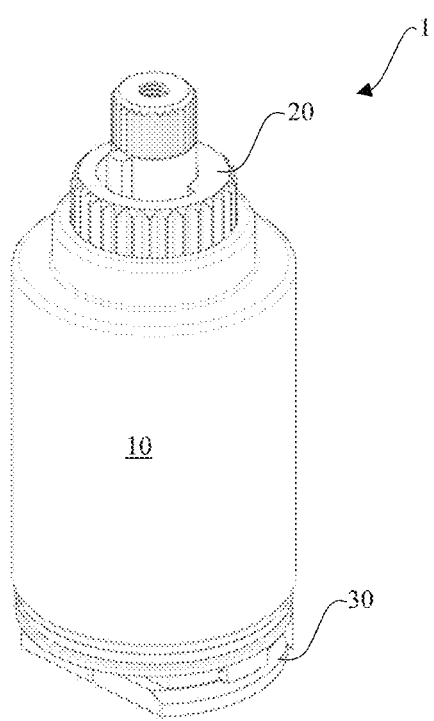
FIG. 1 shows a perspective view of the flow-rate control valve in accordance with an embodiment of the invention.
Figure 2:
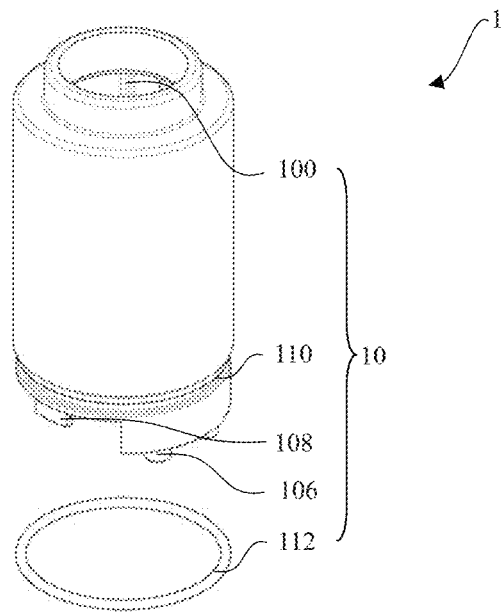
FIG. 2 shows an exploded perspective view of a subassembly of the flow-rate control valve in accordance with the embodiment of the invention.
Figure 2:
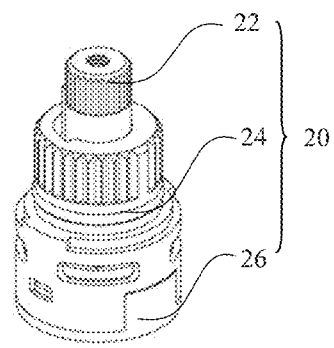
Figure 2:
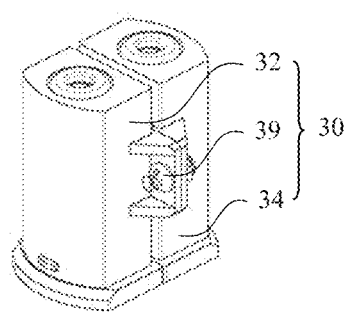
Figure 3:
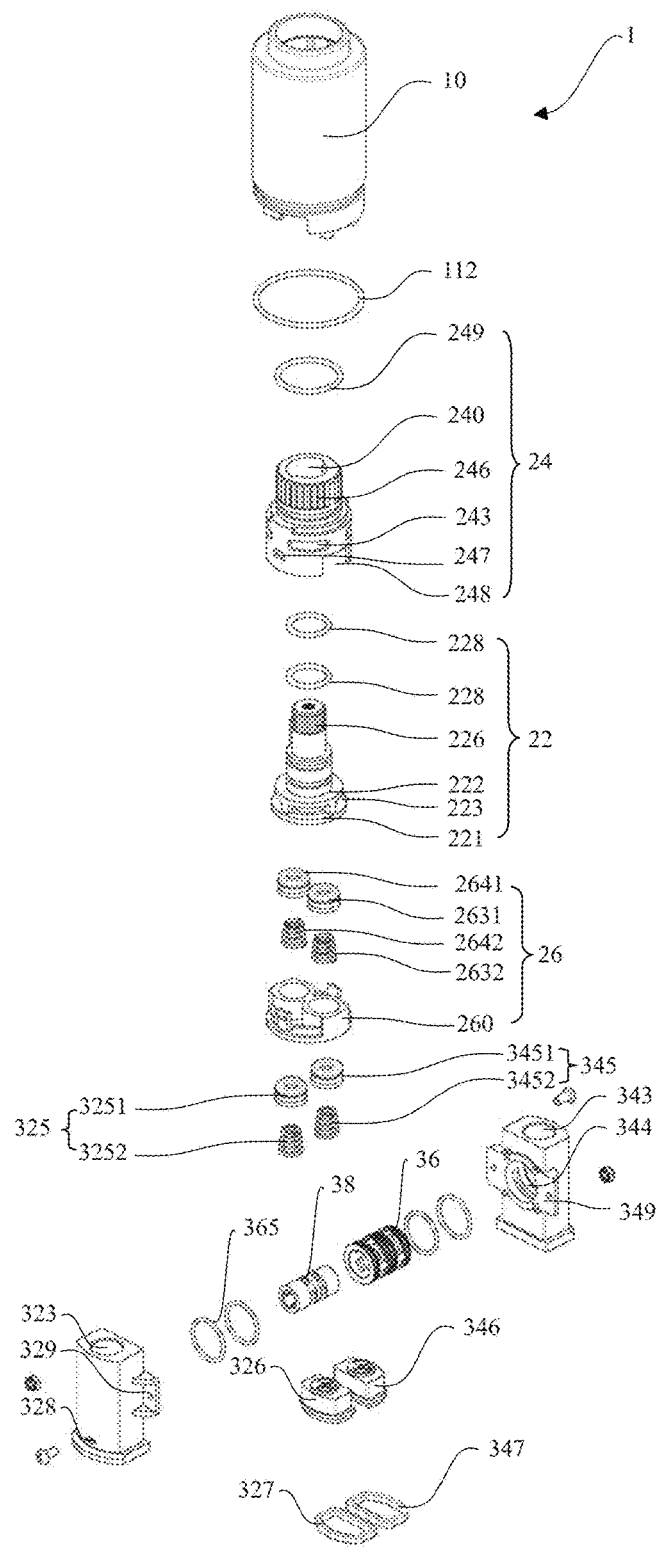
FIG. 3 shows an exploded perspective view of the components of the flow-rate control valve in accordance with the embodiment of the invention.
Figure 4:
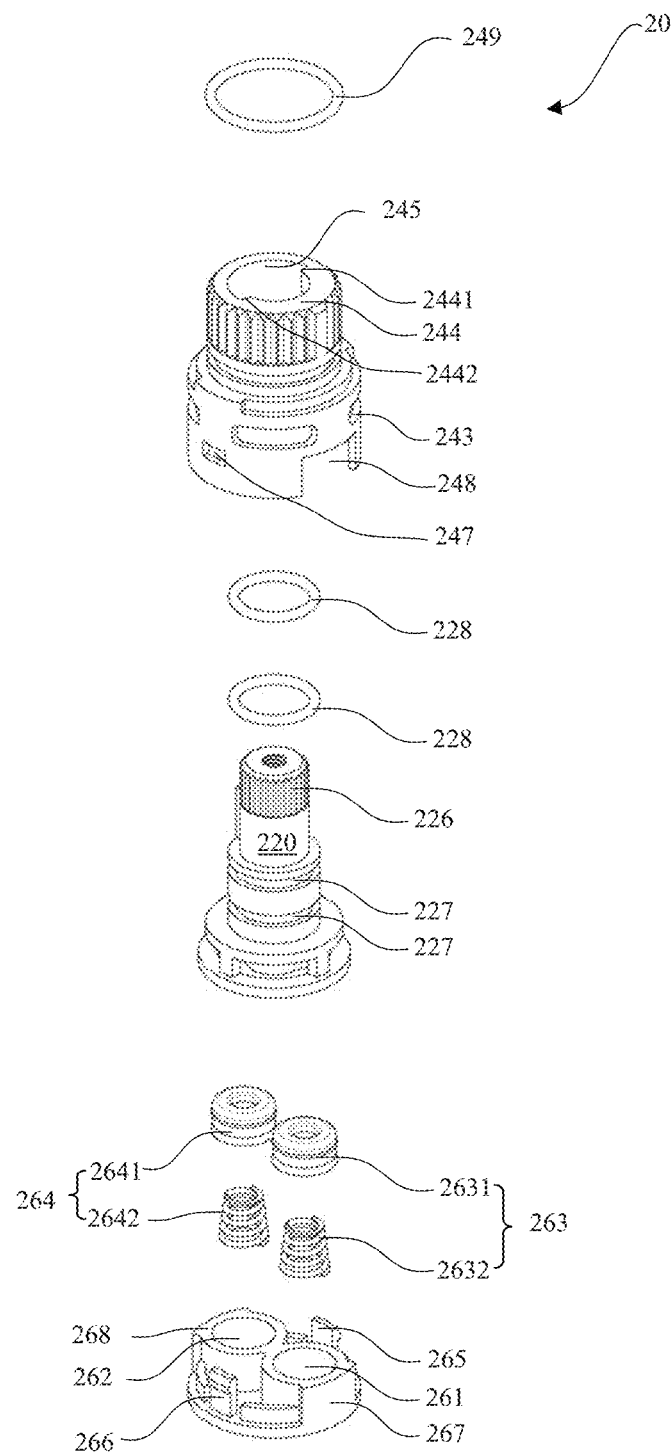
FIG. 4 shows an exploded perspective view of the adjustable valve module of the flow-rate control valve in accordance with the embodiment of the invention.
Figure 5:
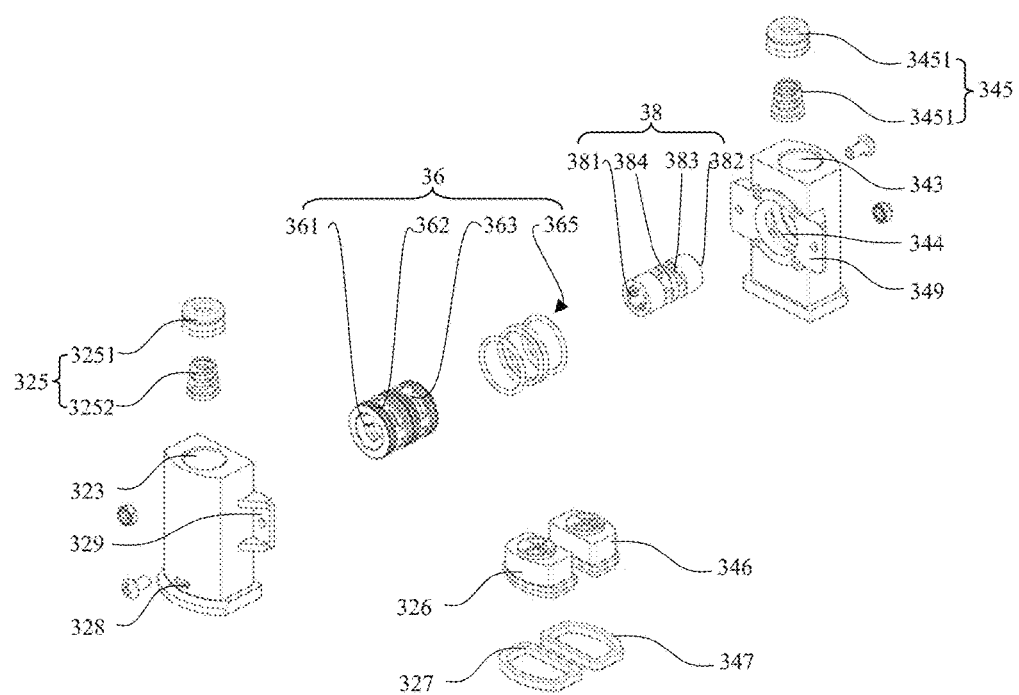
FIG. 5 shows an exploded perspective view of the balance valve module of the flow-rate control valve in accordance with the embodiment of the invention.

Referring to the FIGS. 1 and 2 and in an embodiment, a fluid mixing valve 1, also known as fluid control valve, for mixing a first fluid and a second fluid according to the disclosure is illustrated. The fluid mixing valve is for example used for a shower system. However, it is contemplated that the fluid mixing valve can for example be used for any other suitable applications, such as in other faucets, which fall within the scope of the invention.

Figure 7A:
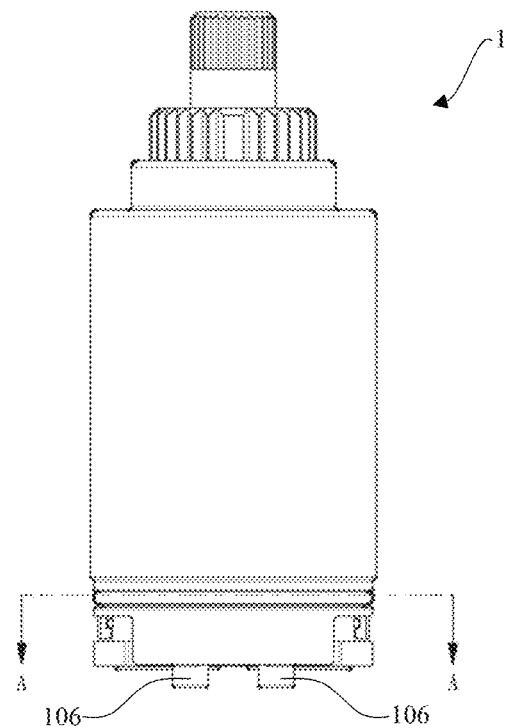
FIG. 7A shows a plan view of the flow-rate control valve in accordance with the embodiment of the invention.
Figure 7B:
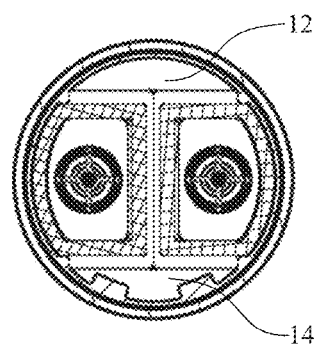
FIG. 7B shows a sectional view through the A-A line in FIG. 7A.

The fluid mixing valve 1 may comprise a housing 10, also known as a valve housing or a cover, an adjustable valve module 20 positioned within the housing and a balance valve module 30 positioned within the housing. The fluid mixing valve 1 may further comprise one or more mixed fluid discharging passages 12, 14 (FIGS. 7A-7B) defined between the housing and the adjustment and balance valve assemblies. In the illustrated embodiments, the first fluid for example includes a cold water, the second fluid for example includes a hot water, and the mixed fluid for example includes a warm water. For the sake of convenience, hereinafter the terms "water" may be used to represent the fluid, "cold water" to represent the first fluid, "hot water" to represent the second fluid, and "warm water" to represent the mixed fluid. However, it is appreciated by the skilled in the art that the first, second and mixed fluids can be any suitable fluids.

As shown in FIG. 2, the housing 10 may be formed as an integrally unitary housing. The housing 10 may have a generally cylindrical shape, and comprise an inner chamber (not indicated) for receiving the adjustable valve module 20 and the balance valve module 30, and a housing hole 100 on the top thereof. The housing 10 may at the bottom comprise plug-fit portions 106 for example for fitting into corresponding plug-fit holes in the valve block (not shown), such that the adjustable valve module 20 and the balance valve module 30 of the fluid mixing valve 1 are tightly compressed onto the valve block. The housing 10 may further comprise hooks 108 for snap fitting with snap-fit projections of the balance valve module. Moreover, the housing may also comprise an annular groove 110, and a sealing element, such as an O-ring 112, positioned in the annular groove 110 in order to sealingly mount the housing 10 onto for example the valve block.

Figure 8B:
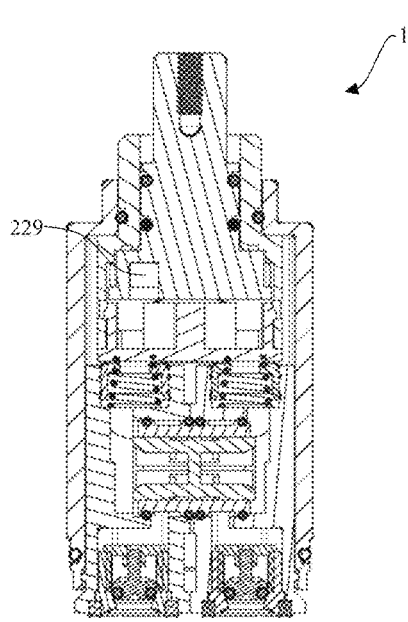
FIG. 8B shows a sectional view through the B-B line in FIG. 8A.
Figure 8A:
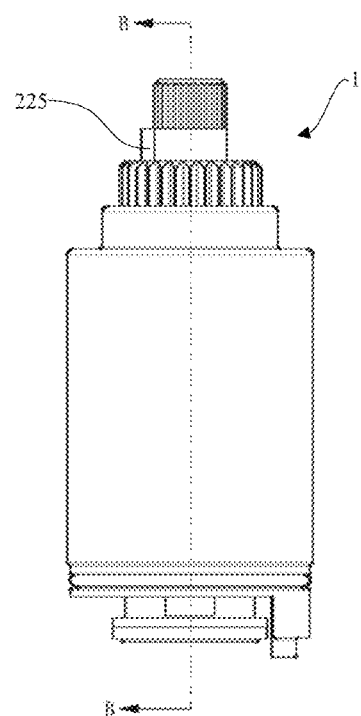
FIG. 8A shows a plan view of the flow-rate control valve in accordance with the embodiment of the invention.

Referring to for example FIG. 8B and in the embodiment, the adjustable valve module 20 is for example directly arranged on the balance valve module 30 in such a manner that the adjustable valve module is rotatable about a longitudinal axis of the fluid mixing valve 1.

Referring to FIGS. 2-4, 8A-8B, 9A-9B, 11A-11C, 12A-12C and 13A-13B, an adjustable valve module 20 according to the embodiment of the disclosure is illustrated.

The adjustable valve module 20 may comprise a temperature adjustment shaft 22, an inner casing member 24 also referred as an inner valve housing, and a flow-rate adjustment seat 26, also referred as a switching seat. The flow-rate adjustment seat 26 may be fastened, such as snap fitted or fastened by other fixing means, to the inner casing member 24, as will be described below. The temperature adjustment shaft 22 is rotatably received within an inner chamber of the inner casing member 24 and is directly sit on the flow-rate adjustment seat 26.

Referring to FIGS. 2-4, 8A-8B, 9A-9B, 11A-11C, 12A-12C, 13A-13B and 14A-14B, the temperature adjustment shaft 22 may comprise a shaft body 220, a first valve plate, also referred as an adjustable valve plate 221, at the bottom of the shaft body 220, a second valve plate, also referred as an upper valve plate 222, spaced from the first valve plate 221, a mixing chamber 229 defined between the first and second valve plates and one or more lateral openings 223 for fluidly communicating the mixing chamber 229 with the mixed fluid discharging passages 12, 14. However, it is contemplated that other openings can also be used and in communication with the mixed fluid discharging passages 12, 14.

Referring particularly to FIGS. 14A-14B, the adjustable valve plate 221 defines a single adjustment aperture 224. The single adjustment aperture 224 has a generally arc shape which in the illustrated embodiment has an arc angle preferably greater than 180° and smaller than 360°, for example between 210° and 350°, and for example between 300° and 350°. The single adjustment aperture 224 defines an intermediate portion 2240, a first end 2242 and a second end 2244, with the adjustment aperture 224 being wider at the intermediate portion 2240 and tapering towards the first end 2242 and the second end 2244 respectively. Preferably, the adjustment aperture on its side wall has bugles 2246, 2248 adjacent to the first and second ends. Mirror symmetry of the adjustment aperture 224 may be advantageous in realizing wide temperature adjustment range and high temperature accuracy. Furthermore, the installation of the valve is reversible, which provides flexibility, without the need of strictly positioning the adjustment aperture in a predefined orientation in the prior art dual-aperture configuration. In the embodiment, the temperature adjustment shaft 22, including the adjustable valve plate 221, can be for example integrally made of plastic material.

The temperature adjustment shaft 22 may further comprise on the top a first mounting portion 226, such as a spline portion, for mounting a handle or a knob. However, it is contemplated that other mounting portion or a manipulation portion that is configured to be directly manipulated by a user can also be arranged on the top of the temperature adjustment shaft 22.

The temperature adjustment shaft 22 may further comprise an integral, protruding block 225 extending from the lateral surface of the shaft body 220. In the illustrated embodiment, the protruding block 225 extends downwards from the bottom of the first mounting portion 226.

The temperature adjustment shaft 22 may further comprise one or more (two in the illustrated embodiment) annular grooves 227 adjacent to the bottom of the protruding block 225. Corresponding sealing elements, for example O-rings 228, are configured to be received in the annular groove 227.

The inner casing member 24 is generally in a cylindrical shape and has an outer diameter approximately corresponding to or slightly less than the inner diameter of the housing 10, such that there is a gap between the inner surface of the housing 10 and the outer surface of the inner casing member 24. Preferably, the inner casing member 24 may be integrally made of plastic material.

The inner casing member 24 has an inner chamber (not signed) and an inner casing hole 240 located on the top of the inner casing member 24 and in communication with the inner chamber. The inner casing hole 240 defines a limit groove 245, and a stop portion 244 having a first stop surface 2441 and a second stop surface 2442. The protruding block 225 is disposed in the limit groove 245, and is movable between the first stop surface 2441 and the second stop surface 2442, such that the range of rotation of the temperature adjustment shaft 22 in relation to the inner casing member 24 is defined.

The inner casing member 24 further comprises a second mounting portion 246 for mounting a handle or knob, such as a spline portion, in a portion of the housing 10 extending from the housing hole 100, e.g., in the top portion in the illustrated embodiment. Nevertheless, it is contemplated that other mounting portions or a manipulation portion that is configured to be directly manipulated by a user can also be arranged on the top of the inner casing member 24.

Figure 9A:
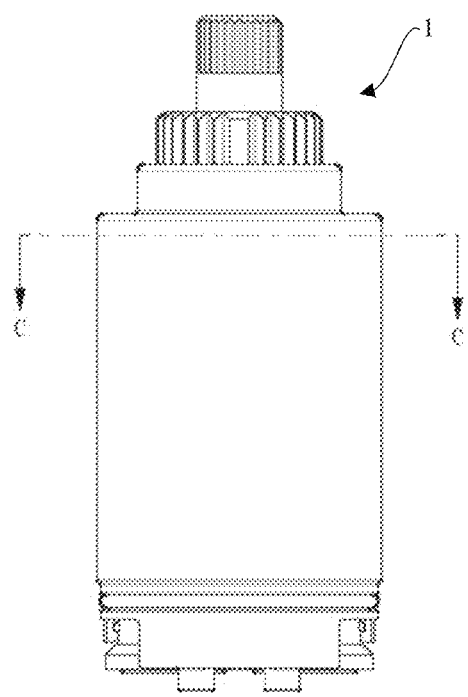
FIG. 9A shows a plan view of the flow-rate control valve in accordance with the embodiment of the invention.
Figure 9B:
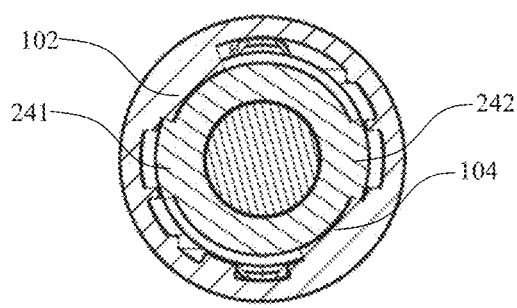
FIG. 9B shows a sectional view through the C-C line in FIG. 9A.
Figure 10A:
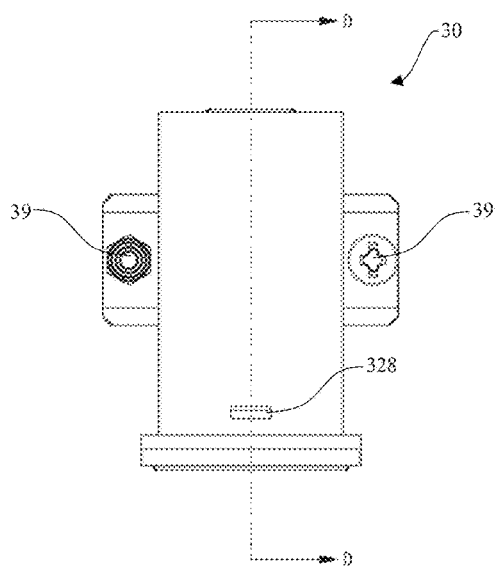
FIG. 10A shows a plan view of the balance valve module of the flow-rate control valve in accordance with the embodiment of the invention.
Figure 10B:
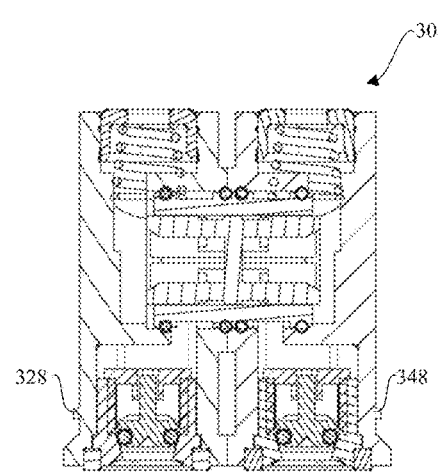
FIG. 10B shows a sectional view through the D-D line in FIG. 10A.

The inner casing member 24 may comprise a shoulder at a transition region between the inner casing hole 240 and the inner chamber. Referring particularly to FIGS. 9A-9B, the inner casing member 24 may further comprise a first stopper 241 and a second stopper 242 that are for example located at the shoulder and are diametrically opposed to each other. Correspondingly arranged on the inner wall of the housing 10 are a first stop portion 102 and a second stop portion 104 diametrically opposed to each other, and two limit grooves defined between the first and second stop portions 102, 104. Each of the first and second stopper 241, 242 is arranged within one of the two limit grooves, and is movable between the two stop portions, such that the range of rotation of the inner casing member 24 (and also the flow-rate adjustment seat 26 and the temperature adjustment shaft 22) in relation to the housing 10 (and also the balance valve module) is defined.

The inner casing member 24 may further comprise an annular groove longitudinally arranged between the second mounting portion 246 and the stoppers 241, 242. Received in the annular groove is a sealing element, such as an O-ring 249.

The inner casing member 24 may further comprise one or more lateral openings 243 in communication with the lateral openings 223 for fluidly communicating the mixing chamber 229 to the mixed fluid discharging passage 12, 14. Nevertheless, it is envisaged that other openings can be used for communicating with the mixed fluid discharging passage 12, 14.

The inner casing member 24 may further comprise a pair of snap-fit openings 247 located below the lateral openings and diametrically opposed to each other, and a pair of mating notches 248 diametrically opposed to each other.

The flow-rate adjustment seat 26 or switching seat may comprise a seat body 260 defining a first hole 261 and a second hole 262. Preferably, the seat body 260 may be integrally made of plastic material. The flow-rate adjustment seat 26 may further comprise a first washer assembly 263 received in the first hole 261, and a second washer assembly 264 received in the second hole 262. The first washer assembly 263 may comprise a first washer 2631, and a first washer spring 2632 for supporting the first washer 2631. The second washer assembly 264 may comprise a second washer 2641, and a second washer spring 2642 for supporting the second washer 2641.

The flow-rate adjustment seat 26 may comprise a first snap-fit member 265, such as a hook, and a second snap-fit member 266, such as a hook, which are diametrically opposed to each other, and may further comprise a first and a second mating portions 267, 268 diametrically opposed to each other and adjacent to the first hole and the second hole. The first and second snap-fit members 265, 266 are configured to be snapped into the snap-fit openings 247. The first and second mating portions 267, 268 are fitted into the mating notches 248, such that the subassembly of the inner casing member 24 and the flow-rate adjustment seat 26 generally has a smooth appearance of cylindrical shape, so as to provide improved flow characteristics.

Referring to FIGS. 2, 3, 5, and 10A-10B, the balance valve module 30 may comprise a first balance valve casing 32 and a second balance valve casing 34 which are upright. The first balance valve casing 32 may define a first fluid inlet 321 that can be used as an inflow opening for the first fluid of the fluid mixing valve, a first fluid outlet 323, a first balance chamber 322 between the first fluid inlet 321 and the first fluid outlet 323, and a first lateral opening (not signed) in communication with the first balance chamber 322. The second balance valve casing 34 may define a second fluid inlet 341 that can be used as an inflow opening for the second fluid of the fluid mixing valve, a second fluid outlet 343, a second balance chamber 342 between the second fluid inlet 341 and the second fluid outlet 343, and a second lateral opening 344 in communication with the second balance chamber 342 and opposed to the first lateral opening.

The first and second balance valve casings 32, 34 are provided with mounting portions 329, 349 having mounting holes. One or more fastening means 39, such as screw(s) and nut(s), can be fastened to the mounting portions in order to secure the first and second balance valve casings 32, 34 to each other, with the sides at which the lateral openings are arranged opposed to each other.

The first and second balance valve casings 32, 34 can also be provided with a first and a second snap-fit projections 328, 348 for snapping and securing the balance valve module 30 to the housing 10, with the housing in turn being snapped and secured to the valve block (not shown), such that moving part in the fluid mixing valve is minimized.

The balance valve module 30 may further comprise a valve spool subassembly arranged in the first and second lateral openings 344, such that the valve spool subassembly can be arranged transversely to the balancing casings 32, 34 and extend into the first and second balance chambers 322, 342 through the first and second lateral openings 344. The valve spool subassembly may comprise an outer balance valve spool 36 having an outer spool bore 361 and a peripheral opening 363, and an inner balance valve spool 38 having a first inner spool bore 381, a second inner spool bore 382, a partition wall 384 for separating the first and second inner spool bores 381, 382 from each other, and a peripheral opening 383. The outer balance valve spool 36 at outer circumference thereof has a plurality of annular grooves 362 for receiving corresponding sealing elements, such as O-rings 365.

Any pressure difference between the supplied hot and cold waters can act onto the partition wall 384 of the inner balance valve spool 38, such that the inner balance valve spool 38 can be continuously displaced to balance the pressure difference by means of the slidable arrangement of the inner balance valve spool 38 within the outer balance valve spool 36.

The balance valve module 30 may further comprise a first check valve 326 arranged in the first fluid inlet 321, and a first sealing gasket 327. The balance valve module 30 may further comprise a second check valve 346 arranged in the second fluid inlet 341. Since the balance valve module 30 is fixed to the housing 10 and thus to the stationary valve block (not shown), the sealing gaskets 327, 347 that are relatively small in size and surround the first and second check valves 326, 346 are sufficient to tightly seal the inflow end of the fluid mixing valve, such that the sealing effect of the fluid mixing valve is achieved with simple structure and less components.

The balance valve module 30 may further comprise a third washer assembly 325 arranged in the first fluid outlet 323 and a fourth washer assembly 345 arranged in the second fluid outlet 343. The third washer assembly 325 may comprise a third washer 3251 and a third washer spring 3252 for supporting the third washer 3251. The fourth washer assembly 345 may comprise a fourth washer 3451 and a fourth washer spring 3452 for supporting the fourth washer 3451.

Figure 6:
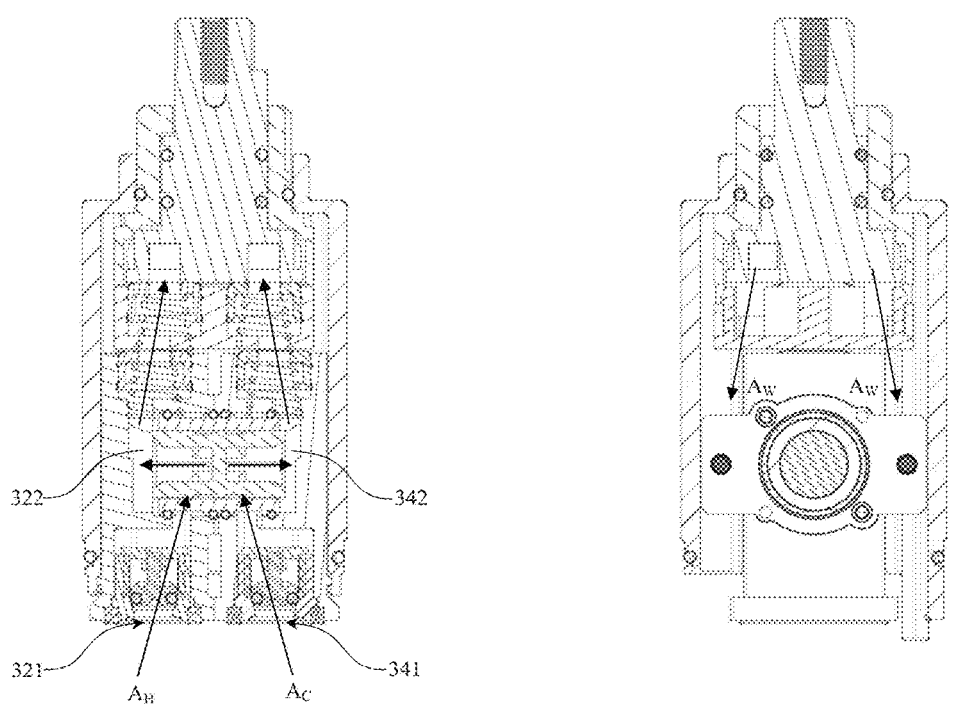
FIGS. 6A and 6B show sectional views of the flow-rate control valve in accordance with the embodiment of the invention, with the sections of FIGS. 6A and 6B being substantively perpendicular to each other.
Figure 12A:
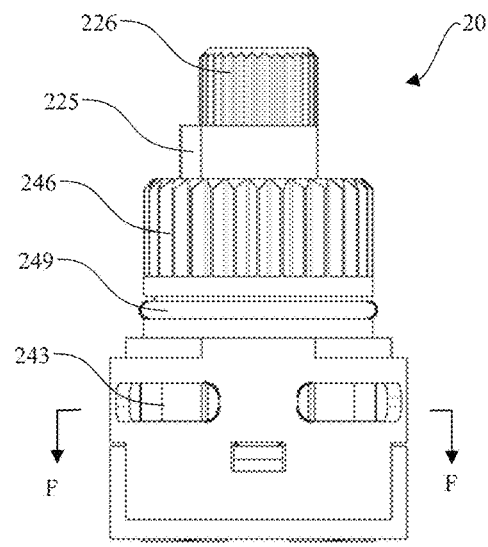
FIGS. 12A-C show plan views of the adjustable valve module in accordance with one embodiment of the invention, with the adjustment shaft of the adjustable valve module is at a position in relation to the flow-rate adjustment seat.
Figure 12B:
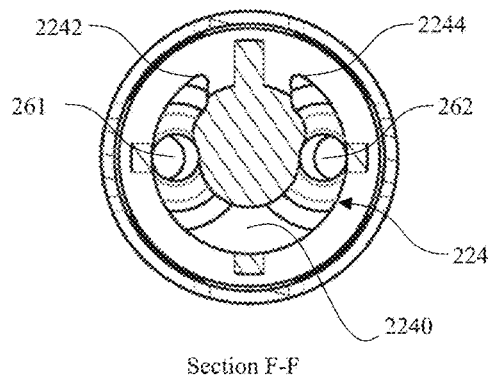
Figure 12C:
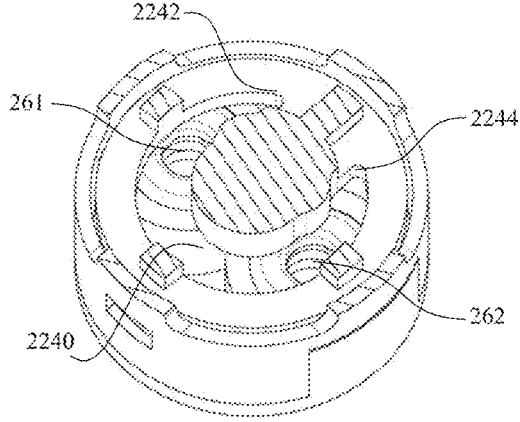
Figure 13A:
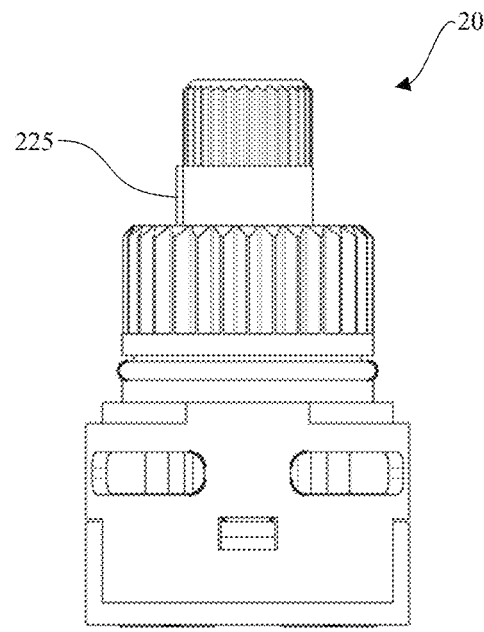
FIGS. 13A-B show the adjustable valve module as illustrated in FIGS. 12A-C, with the adjustment shaft is at another position different from that in FIGS. 12A-C.
Figure 13B:
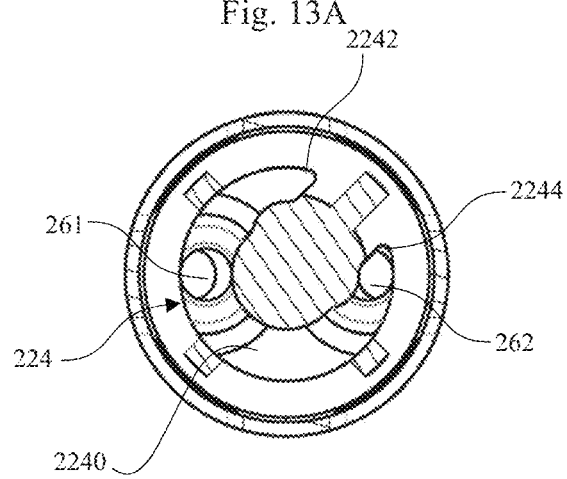
Figure 15:
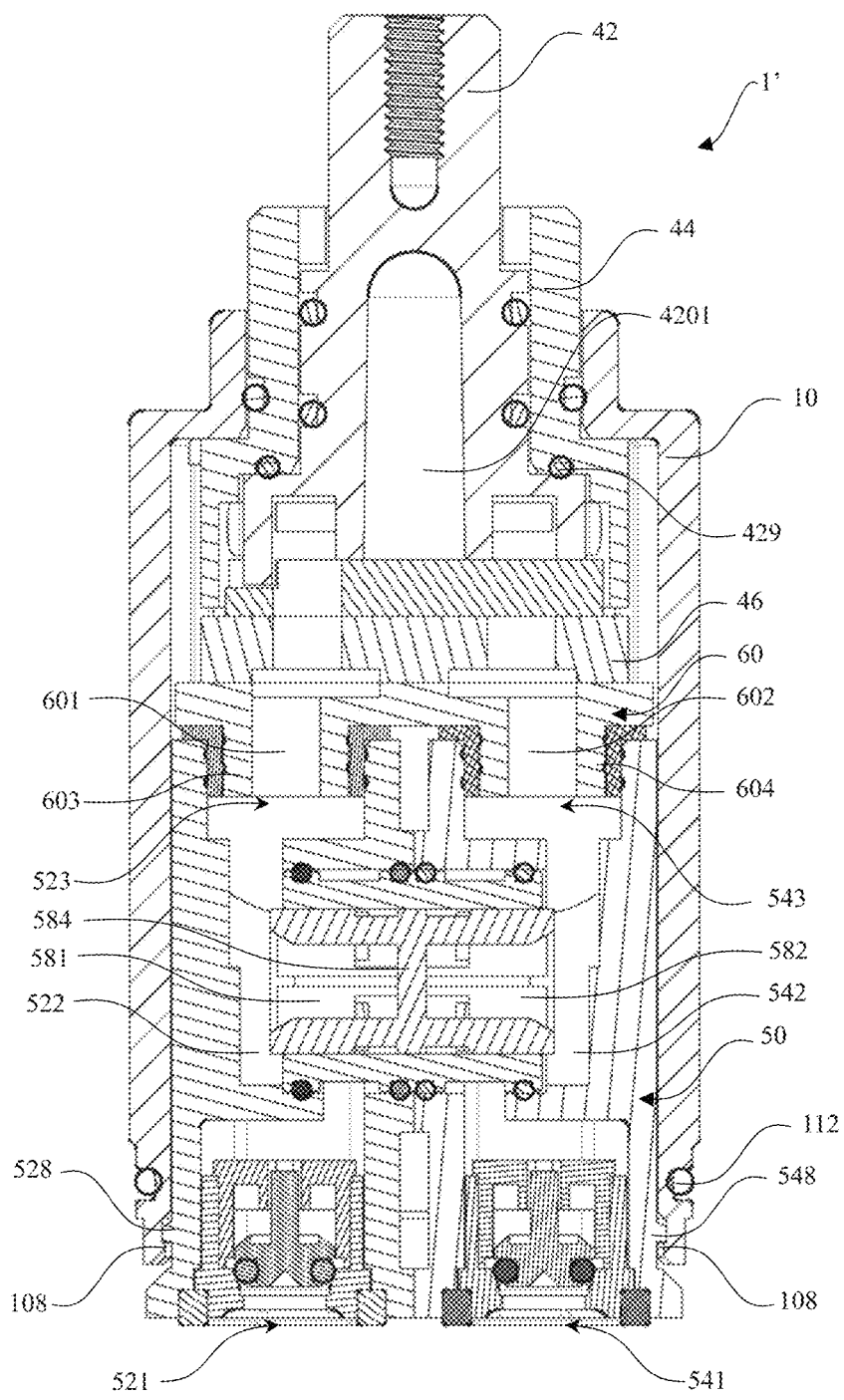
FIG. 15 shows a sectional view of the flow-rate adjustable valve in accordance with another embodiment of the invention.
Figure 16:
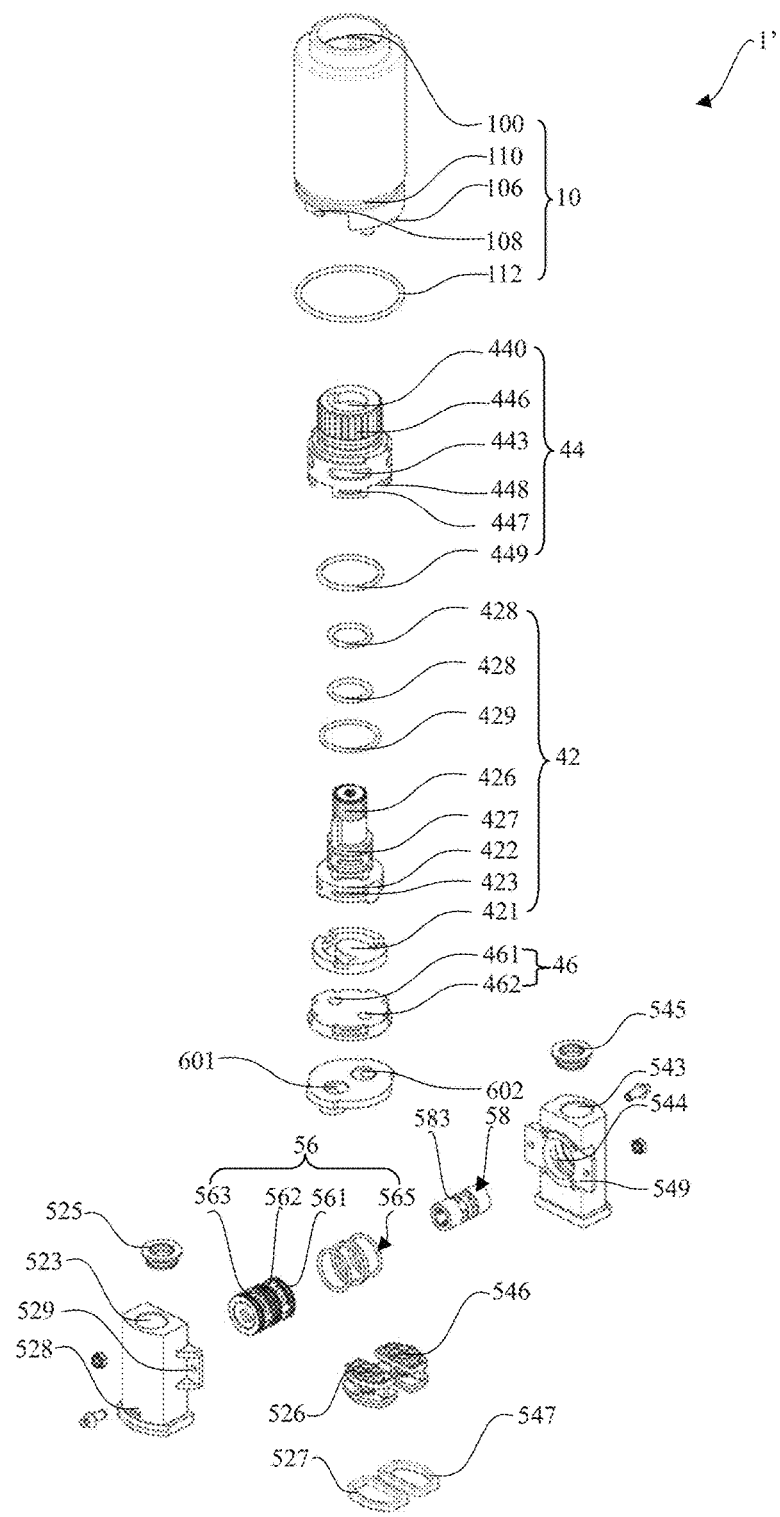
FIG. 16 shows an exploded view of the flow-rate adjustable valve in accordance with the another embodiment of the invention.

Referring particularly to FIGS. 6, 12A-C and 13A-B, the operation method and the flow of the fluid mixing valve 1 according to the disclosure will be described. When a user is desired to for example adjust the water temperature, for example before opening the water flow (switching on the switching seat) or during a shower after opening the water flow (switching on the switching seat), the user may rotate the temperature adjustment shaft in relation to the inner casing member and thus the flow-rate adjustment seat (switching seat), to change the ratio between the overlapped area of the first hole of the flow-rate adjustment seat with the adjustment aperture of the temperature adjustment shaft and the overlapped area of the second hole of the flow-rate adjustment seat with the adjustment aperture of the temperature adjustment shaft, and thus to change their discharge sections, such that consequently the mixing ratio between the cold and hot waters is changed and thus the temperature can be varied. For instance, the fluid mixing valve is rotated from the position as shown in FIG. 12B, in which the flow areas of the first fluid such as cold water and of the second fluid such as hot water are approximately equal (i.e., the mixing ratio is about 1:1), to the position as shown in FIG. 13B, in which the flow area of the first fluid such as cold water is greater than the flow area of the second fluid such as hot water (i.e., the mixing ratio is greater than 1:1). When the user wishes to for example adjust the flow rate after opening the water flow, the user may rotate the flow-rate adjustment seat in relation to the stationary balance valve module, with the temperature adjustment shaft rotating along with the flow-rate adjustment seat, so as to change, for example, increase or decrease, the flow rates of the first and second fluids in a substantially synchronous manner, by means of adjusting the overlapped area between the first hole and the first fluid outlet and the overlapped area between the second hole and the second fluid outlet. Referring to FIG. 6, the inflowing first fluid, such as cold water, flows from the first fluid inlet through the first balance chamber, the first fluid outlet, the first hole and the adjustment aperture, and into the mixing chamber. The inflowing second fluid, such as hot water, flows from the second fluid inlet through the second balance chamber, the second fluid outlet, the second hole and the adjustment aperture, and into the mixing chamber. The first fluid such as cold water and the second fluid such as the hot water are mixed in the mixing chamber to form mixed fluid such as warm water, which then flows out via the lateral openings of the shaft and the lateral openings of the inner casing member, and further flows through the mixed fluid discharging passage extending longitudinally and formed between the inner wall of the housing and the outer walls of the inner casing member and of the balance valve module (e.g., the outer wall of the balance valve where the mounting portion is arranged), and consequently out of the fluid mixing valve. Then, the mixed fluid for example flows into pipelines via flow channels in the valve block, and for example sprays onto the user's body or head.

In the embodiment according to the invention, the flow-rate adjustment seat defines a first valve face for adjusting the flow rates of the first and second fluids, while the shaft, more specifically the adjustment shaft, defines a second, downstream valve face for adjusting the ratio between the first and second fluids. In the illustrated embodiment and due to the friction resistance directly or indirectly applied to the first valve face, the friction force applied to the first valve face by the second valve face is not sufficient to drive the first valve face to rotate along with the second valve face, when the second valve face is rotated. When the first valve face is rotated, the friction force directly or indirectly applied to the second valve face (e.g., by the first valve face) will drive the second valve face to rotate along with the first valve face. In this manner, the flow-rate adjustment seat will not be rotated and thus the flow rate will remain the same when rotating the temperature adjustment shaft to adjust temperature, while the position of the temperature adjustment shaft with respect to the flow-rate adjustment seat will not change and thus the temperature will remain the same when rotating the flow-rate adjustment seat. A first friction generating means for applying friction resistance to the first valve face for example includes the sealing element, such as the O-ring, arranged between the housing and the inner casing member and/or the first and second washers contacting with the flow-rate adjustment seat, while it is conceivable that additional or alternative friction generating means, such as an additional sealing element, may be used. A second friction generating means for applying friction force to the second valve face for example includes the sealing element, such as the O-ring, arranged between the shaft and the inner casing member, while it is conceivable that additional or alternative friction generating means, such as an additional sealing element, may be used. Although in the illustrated embodiment the friction force or the friction generating means is utilized to realize the above-mentioned arrangement of rotation, other means, for example releasable securing member for securing the shaft after performing the temperature adjustment, is also conceivable.

Referring to FIGS. 1-14, the method of assembling the fluid mixing valve, in particular the adjustable valve module, according to the embodiment of the invention will be described. The adjustable valve module according to the invention can be assembled by inserting the temperature adjustment shaft into the inner casing member from the bottom and then snapping the flow-rate adjustment seat to the inner casing member. Thereafter, the assembled adjustable valve module and the balance valve module may be inserted into the housing, and then the snap-fit projections of the balance valve module may be snapped to snap-fit portions of the housing to form the assembled mixing valve.

The fluid mixing valve 1 according to the invention has simple structure with less components, especially movable components, and is easy to be assembled, while a desired effect of sealing is realized. In addition, the fluid mixing valve minimizes the use of washers or gaskets.

Referring to FIGS. 15-18, a fluid mixing valve 1' according to the second embodiment of the invention is shown, which is provided with a plurality of ceramic components, such that the use of washers is further reduced in relation to the first embodiment. As shown in the comparison in FIGS. 19A and 19B, the fluid mixing valves 1, 1' in the first and second embodiments have similar housings 10 or valve housings, and uses similar means for adjusting flow rate and/or temperature and similar methods for assembling. However, comparing with that in the first embodiment, the fluid mixing valve in the second embodiment has a separate, ceramic adjustable valve plate 421, a ceramic flow-rate adjustment seat 46, and a ceramic washer 60 located between the flow-rate adjustment seat and the balance valve module.

Referring to FIGS. 15-18, an adjustable valve module 40 according to the second embodiment of the disclosure is illustrated.

The adjustable valve module 40 may comprise a temperature adjustment shaft 42, an inner casing member 44, also referred as inner valve housing, and a flow-rate adjustment seat 46, also referred as switching seat. The flow-rate adjustment seat 46 may be fastened, such as snap fitted or fastened by other fixing means, to the inner casing member 44, as will be described below. The temperature adjustment shaft 42 is rotatably received within the inner chamber of the inner casing member 44 and is directly sit on the flow-rate adjustment seat 46.

Referring to FIGS. 15-18, the temperature adjustment shaft 42 may comprise a shaft body 420, a first valve plate, also referred as adjustable valve plate 421, located on the bottom of the shaft body 420, a second valve plate, also referred as upper valve plate 422, spaced from the first valve plate 421, a mixing chamber defined between the first and second valve plates, and one or more lateral openings 423 for fluidly communicating the mixing chamber with the mixed fluid discharging passages. However, it is contemplated that other openings can also be used to be in communication with the mixed fluid discharging passages.

Figure 18:
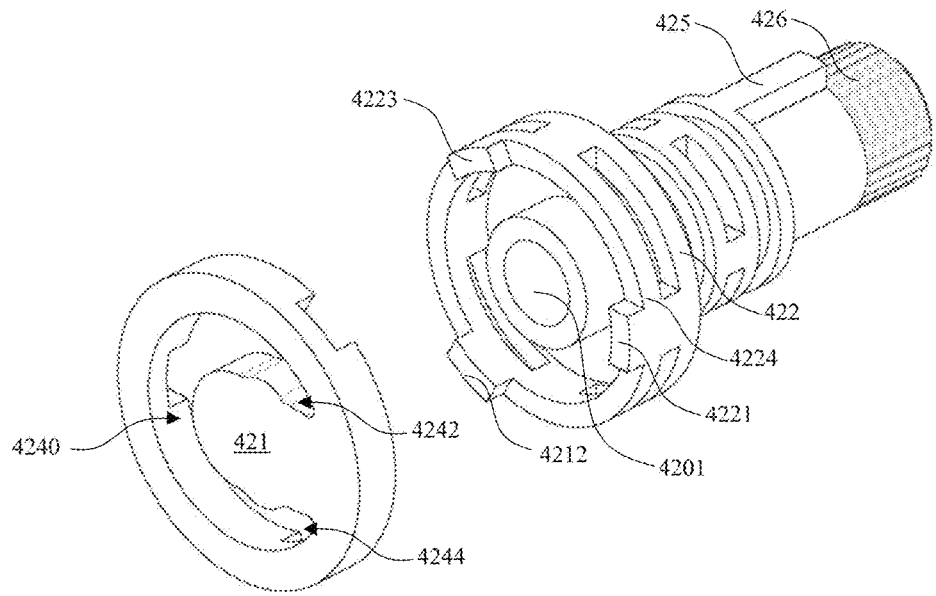
FIG. 18 shows a perspective view of the adjustment shaft of the adjustable valve module of the flow-rate adjustable valve in accordance with the another embodiment of the invention.
Figures 19A, 19B:
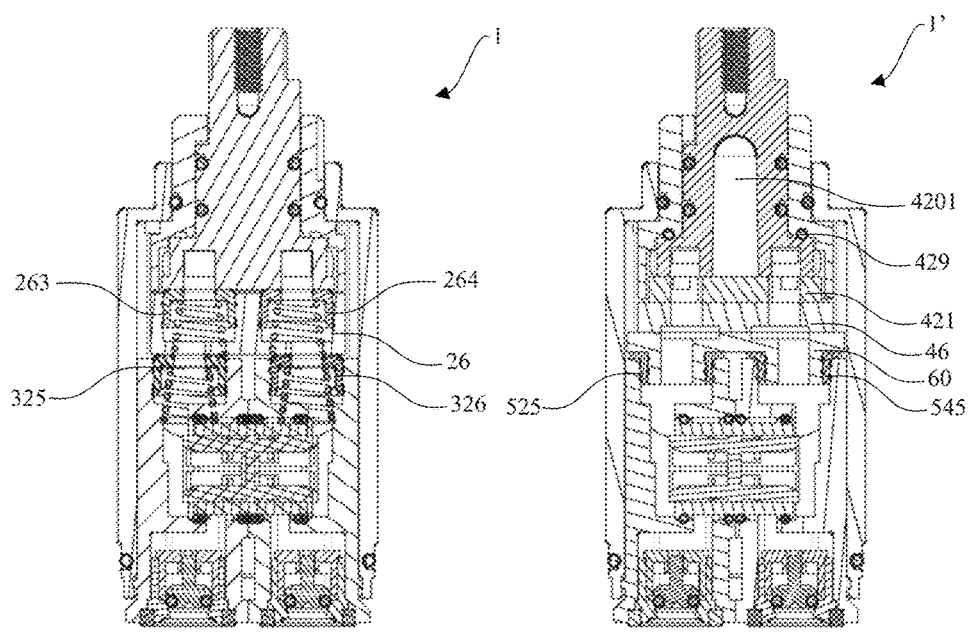
FIGS. 19A and 19B depict comparison between the flow-rate adjustable valves in accordance with the two embodiments of the invention.

In the illustrated embodiment and referring to FIG. 18, the adjustable valve plate 421 is a separate component made of ceramic, and the rest of the shaft, such as the shaft body 420, may still be made of conventional materials, such as plastic material. The adjustable valve plate 421 may have a plurality of recesses 4211, 4212, 4213, while a plurality of corresponding protrusions 4231, 4232, 4233 extend longitudinally from the upper valve plate 423 and are configured to be positioned in the respective recesses, such that the adjustable valve plate is able to rotate along with the rest of the shaft. Preferably, provided between the first and second valve plates are a plurality of reinforcing ribs 4224 which in the shown embodiment interconnect the protrusions to each other for providing reinforcement.

Referring in particular FIG. 18, the adjustable valve plate 421 defines a single adjustment aperture 424. The single adjustment aperture 424 has a generally arc shape, which in the illustrated embodiment has an arc angle preferably greater than 180° and smaller than 360°, for example between 210° and 350°, and for example between 300° and 350°. The single adjustment aperture 424 defines an intermediate portion 4240, a first end 4242, and a second end 4244, with the adjustment aperture 424 being wider at the intermediate portion 4240 and tapering towards the first end 4242 and the second end 4244. Preferably, the adjustment aperture on its side wall has bugles adjacent to the first and second ends. Mirror symmetry of the adjustment aperture 424 may be advantageous in realizing wide temperature adjustment range and high temperature accuracy. Furthermore, the installation of the valve is reversible, which provides flexibility, without the need of strictly positioning the adjustment aperture in a predefined orientation in the prior art dual-aperture configuration.

The temperature adjustment shaft 42 may further comprise a first mounting portion 426, such as a spline portion, located on the top for mounting a handle or a knob. However, it is contemplated that other mounting portion or a manipulation portion that is configured to be directly manipulated by a user can also be arranged on the top of the temperature adjustment shaft 42.

The temperature adjustment shaft 42 may further comprise an integral protruding block 425 extending from the lateral surface of the shaft body 420. In the illustrated embodiment, the protruding block 425 extends downwards from the bottom of the first mounting portion 426.

The temperature adjustment shaft 42 may further comprise one or more (two in the shown embodiment) annular grooves 427 located at the bottom of the protruding block 425. Corresponding sealing elements, such as O-rings 428, are configured to be received in the annular groove 427. In the illustrated embodiment, arranged between the upper valve plate of the temperature adjustment shaft and the inner casing member is also a sealing element, such as an O-ring 429.

The inner casing member 44 is generally in a cylindrical shape and has an outer diameter approximately corresponding to or slightly less than the inner diameter of the housing 10, such that there is a gap between the inner surface of the housing 10 and the outer surface of the inner casing member 44. Preferably, the inner casing member 44 may be integrally made of plastic material. In the illustrated embodiment and for example due to the provision of the separate adjustable valve plate 421, the shaft body 420 may further have a hollow inner chamber to reduce the weight of the shaft.

The inner casing member 44 has an inner chamber (not signed), and an inner casing hole 440 located on the top of the inner casing member 44 and in communication with the inner chamber. The inner casing hole 440 defines a limit groove 445, and a stop portion 444 having a first stop surface 4441 and a second stop surface 4442. The protruding block 425 is positioned in the limit groove 445, and is movable between the first stop surface 4441 and the second stop surface 4442, such that the range of rotation of the temperature adjustment shaft 42 in relation to the inner casing member 44 is defined.

The inner casing member 44 further comprises a second mounting portion 446, such as a spline portion, which is located in the portion of the housing 10 extending out from the housing hole 100, in the top portion in the illustrated embodiment, and is used for mounting a handle or knob. Nevertheless, it is contemplated that other mounting portion or a manipulation portion that is configured to be directly manipulated by a user can also be arranged on the top of the inner casing member 44.

Figure 17:
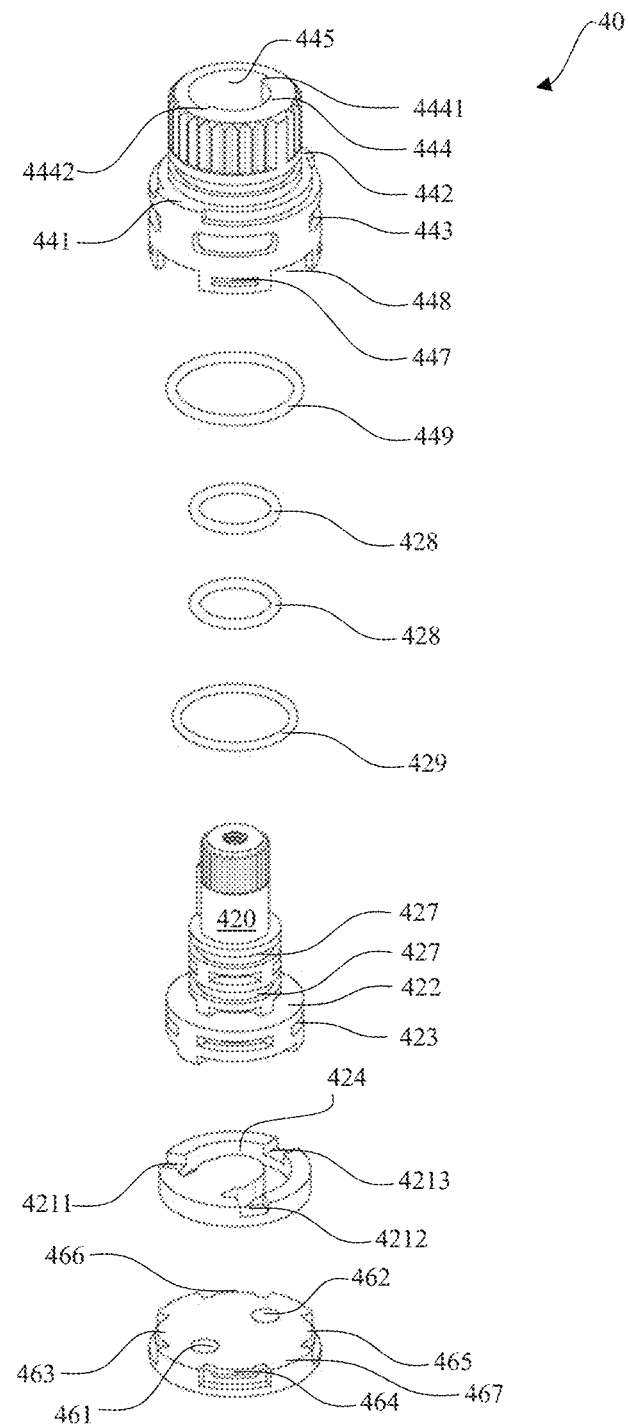
FIG. 17 shows an exploded view of the adjustable valve module of the flow-rate adjustable valve in accordance with another embodiment of the invention.

The inner casing member 44 may have a shoulder at a transition region between the inner casing hole 440 and the inner chamber. Referring particularly to FIG. 17, the inner casing member 44 may further comprise a first stopper 441 and a second stopper 442 that are for example located at the shoulder and are diametrically opposed to each other. Correspondingly arranged on the inner wall of the housing 10 are a first stop portion 102 and a second stop portion 104 that are diametrically opposed to each other, and two limit grooves defined between the first and second stop portions 102, 104, respectively. Each of the first and second stoppers 441, 442 is arranged within one of the two limit grooves and is movable between two stop portions, such that the range of rotation of the inner casing member 44 (and also the flow-rate adjustment seat 46 and the temperature adjustment shaft 42) in relation to the housing 10 (and also the balance valve module) is defined.

The inner casing member 44 may further comprise an annular groove longitudinally between the second mounting portion 446 and the stoppers 441, 442. A sealing element, such as an O-ring 449, may be received in the annular groove.

The inner casing member 44 may further comprise one or more lateral openings 443 in communication with the lateral openings 423 for fluidly communicating the mixing chamber with the mixed fluid discharging passage. Nevertheless, it is envisaged that other openings can be used to be in communication with the mixed fluid discharging passage.

The inner casing member 44 may further comprise two pairs of snap-fit openings 447 below the lateral openings, and two pairs of mating notches 448, with each pair of the snap-fit openings diametrically opposed to each other and with each pair of the mating notches diametrically opposed to each other. The snap-fit openings 447 and the mating notches 448 are arranged in an alternate manner.

The flow-rate adjustment seat 46 or switching seat may comprise a first hole 461 and a second hole 462. Preferably, the flow-rate adjustment body 46 can be integrally made of ceramic. In the illustrated embodiment, the flow-rate adjustment body 46 is not provided with any washer assembly. However, it is possible to incorporate the body with any embodiment with washer assembly.

The flow-rate adjustment seat 46 may comprise for example two pairs of tabs, i.e., a first tab 463, a second tab 464, a third tab 465 and a fourth tab 466, and two pairs of mating portions 467, with each pair of the tabs diametrically opposed to each other and with each pair of the mating portions diametrically opposed to each other. The tabs 436-466 are configured to be snapped into the snap-fit openings 447. The mating portions 467 is fitted into the mating notches 448, such that the subassembly of the inner casing member 44 and the flow-rate adjustment seat 46 generally has a smooth appearance of cylindrical shape, e.g., to provide improved flow characteristics.

Referring to FIGS. 15-18, the balance valve module 50 may comprise a first balance valve casing 52 and a second balance valve casing 54 which are upright. The first balance valve casing 52 may define a first fluid inlet 521 that can be used as an inflow opening for the first fluid of the fluid mixing valve, a first fluid outlet 523, a first balance chamber 522 between the first fluid inlet 521 and the first fluid outlet 523, and a first lateral opening (not signed) in communication with the first balance chamber 522. The second balance valve casing 54 may define a second fluid inlet 541 that can be used as an inflow opening for the second fluid of the fluid mixing valve, a second fluid outlet 543, a second balance chamber 542 between the second fluid inlet 541 and the second fluid outlet 543, and a second lateral opening 544 in communication with the second balance chamber 542 and opposed to the first lateral opening.

The first and second balance valve casings 52, 54 are provided with mounting portions 529, 549 having mounting holes. One or more fastening means 59, such as screw(s) and nut(s), can be fastened to the mounting portions in order to secure the first and second balance valve casings 52, 54 to each other, with the sides at which the lateral openings are arranged opposed to each other.

The first and second balance valve casings 52, 54 may be provided with a first and a second snap-fit projections 528, 548 for snapping and securing the balance valve module 50 to the housing 10, with the housing in turn being snapped to the valve block (not shown), such that moving part in the fluid mixing valve is minimized.

The balance valve module 50 may further comprise a valve spool subassembly arranged in the first and second lateral openings 544, such that the valve spool subassembly can be arranged transversely to the balancing casings 52, 54 and extend into the first and second balance chambers 522, 542 through the first and second lateral openings 544. The valve spool subassembly may comprise an outer balance valve spool 56 having an outer spool bore 561 and a peripheral opening 563, and an inner balance valve spool 58 having a first inner spool bore 581, a second inner spool bore 582, a partition wall 584 for separating the first and second inner spool bores 581, 582 from each other, and a peripheral opening 583. The outer balance valve spool 56 at outer circumference thereof has a plurality of annular grooves 562 for receiving corresponding sealing elements, such as O-rings 565.

Any pressure difference between the supplied hot and cold waters can act onto the partition wall 584 of the inner balance valve spool 58, such that the inner balance valve spool 58 can be continuously displaced to balance the pressure difference by means of the slidable arrangement of the inner balance valve spool 58 within the outer balance valve spool 56.

The balance valve module 50 may further comprise a first check valve 526 arranged in the first fluid inlet 521, and a first sealing gasket 527. The balance valve module 50 may further comprise a second check valve 546 arranged in the second fluid inlet 541. Since the balance valve module 50 is fixed to the housing 10 and thus to the stationary valve block (not shown), the sealing gaskets 527, 547 that are relatively small in size and surround the first and second check valves 526, 546 are sufficient to tightly seal the inflow end of the fluid mixing valve, such that the sealing effect of the fluid mixing valve is achieved with simple structure and less components.

The balance valve module 50 may further comprise a washer 525 arranged at the first fluid outlet 523 and a washer 545 arranged at the second fluid outlet 543.

In this embodiment, there is further provided a ceramic spacer 60 located between the bottom surface of the ceramic flow-rate adjustment seat 46 and the balance valve module 50. The ceramic spacer 60 has a first passage 601, a second passage 602, a first flange 603 surrounding the first passage 601 and extending into the first fluid outlet 523, and a second flange 604 surrounding the second passage 602 and extending into the second fluid outlet 543.

Although two embodiments are specifically described in the detailed description, it should be understood by the skilled in the art will that the features therein can be substituted, supplemented, and interchanged to obtain new embodiments which definitely fall into the scope of the invention. For example and in an embodiment, the flow-rate adjustable valve as illustrated in the first embodiment may include one or any combination of: (a) incorporating an additional ceramic spacer, (b) substituting a ceramic adjustable valve plate for the valve plate, (c) substituting a ceramic flow-rate adjustment seat for the seat, (d) incorporating other fitting means alternative to or addition to mating of the tabs and snap-fit openings, (e) incorporating a hollow inner chamber in the shaft body, and the like. In another embodiment, the flow-rate adjustable valve 1' in the second embodiment may also be modified to include one or any of features in the first embodiment.

For the purposes of this disclosure and unless otherwise specified, "a" or "an" means "one or more." To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, *A Dictionary of Modern Legal Usage* 624 (2d. Ed. 1995). Also, to the extent that the terms "in" or "within" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or multiple components. As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term. From about X to Y is intended to mean from about X to about Y, where X and Y are the specified values.

Moreover, all the directional references (e.g., upper, lower, upward, downward, left, right, leftward, rightward, top, bottom, above, below, vertical, transversal, clockwise, and counterclockwise) are only used for the purpose of recognition to assist the reader in understanding the disclosure, and do not create limitation in particular as to the position, orientation or use of the invention. Joiner references (e.g., attached, coupled, connected, and the like) are to be construed broadly and may include intermediate members between a connection of elements and relative movement between elements. As such, joinder references do not necessarily infer that two elements are directly connected and in fixed relation to each other. It is intended that all matter contained in the above description or shown in the accompanying drawings shall be interpreted as illustrative only and not limiting. Changes in detail or structure may be made without departing from the spirit of the invention as defined in the appended claims.

The present exemplary system and method have been particularly shown and described with reference to the foregoing embodiments, which are merely illustrative of the best modes for carrying out the system and method. It should be understood by those skilled in the art that various alternatives to the embodiments of the system and method described herein may be employed in practicing the system and/or method, without departing from the spirit and scope thereof as defined in the following claims. It is intended that the following claims define the scope of the system and method and that the systems and methods within the scope of these claims and their equivalents be covered thereby. This description of the system and method should be understood to include all novel and non-obvious combinations of elements described herein, and claims may be presented in this or a later application to any novel and non-obvious combination of these elements. Moreover, the foregoing embodiments are illustrative, and no single feature or element is essential to all possible combinations that may be claimed in this or a later application.

| List of Reference Numerals |
| --- |
| 1, 1'-fluid mixing valve |
| 10-housing |
| 100-housing hole |
| 102-first stop portion |
| 104-second stop portion |
| 106-plug-fit portion |
| 108-hook |
| 110-annular groove |
| 112-O-ring |
| 12-mixed fluid discharging passage |
| 14-mixed fluid discharging passage |
| 20-adjustable valve module |
| 22-temperature adjustment shaft |
| 220-shaft body |
| 221-first valve plate or adjustable valve plate |
| 222-second valve plate or upper valve plate |
| 223-lateral opening |
| 224-adjustment aperture |
| 2240-intermediate portion |
| 2242-first end |
| 2244-second end |
| 2246-bugle |
| 2248-bugle |
| 225-protruding block |
| 226-first mounting portion or spline portion |
| 227-annular groove |
| 228-O-ring |
| 229-mixing chamber |
| 24-inner casing member |
| 240-inner casing hole |
| 241-first stopper |
| 242-second stopper |
| 243-lateral opening |
| 244-stop portion |
| 2441-first stop surface |
| 2442-second stop surface |
| 245-limit groove |
| 246-second mounting portion or spline portion |
| 247-snap-fit opening |
| 248-mating notch |
| 249-O-ring |
| 26-flow-rate adjustment seat |
| 260-seat body |
| 261-first hole |
| 262-second hole |
| 263-first washer assembly |
| 2631-first washer |
| 2632-first washer spring |
| 264-second washer assembly |
| 2641-second washer |
| 2642-second washer spring |
| 265-first snap-fit member |
| 266-second snap-fit member |
| 267-first mating portion |
| 268-second mating portion |
| 30-balance valve module |
| 32-first balance valve casing |
| 321-first fluid inlet |
| 322-first balance chamber |
| 323-first fluid outlet |
| 325-third washer assembly |
| 3251-third washer |
| 3252-third washer spring |
| 326-first check valve |
| 327-first sealing gasket |
| 328-first snap-fit projection |
| 329-mounting portion |
| 34-second balance valve casing |
| 341-second fluid inlet |
| 342-second balance chamber |
| 343-second fluid outlet |
| 344-second lateral opening |
| 345-fourth washer assembly |
| 3451-fourth washer |
| 3452-fourth washer spring |
| 346-second check valve |
| 347-second sealing gasket |
| 348-second snap-fit projection |
| 349-mounting portion |
| 36-outer balance valve spool |
| 361-outer spool bore |
| 362-annular groove |
| 363-peripheral opening |
| 365-O-ring |
| 38-inner balance valve spool |
| 381-first inner spool bore |
| 382-second inner spool bore |
| 383-peripheral opening |
| 384-partition wall |
| 39-fastening means |
| 40-adjustable valve module |
| 42-temperature adjustment shaft |
| 420-shaft body |
| 4201-inner chamber |
| 421-first valve plate or ceramic adjustable valve plate |
| 4211-recess |
| 4212-recess |
| 4213-recess |
| 422-second valve plate or upper valve plate |
| 4221-protrusion |
| 4222-protrusion |
| 4223-protrusion |
| 4224-reinforcing rib |
| 423-lateral opening |
| 424-adjustment aperture |
| 4240-intermediate portion |
| 4242-first end |
| 4244-second end |
| 425-protruding block |
| 426-first mounting portion or spline portion |
| 427-annular groove |
| 428-O-ring |
| 429-O-ring |
| 44-inner casing member |
| 440-inner casing hole |
| 441-first stopper |
| 442-second stopper |
| 443-lateral opening |
| 444-stop portion |
| 4441-first stop surface |
| 4442-second stop surface |
| 445-limit groove |
| 446-second mounting portion or spline portion |
| 447-snap-fit opening |
| 448-mating notch |
| 449-O-ring |
| 46-ceramic flow-rate adjustment seat |
| 461-first hole |
| 462-second hole |
| 463-first tab |
| 464-second tab |
| 465-third tab |
| 466-fourth tab |
| 467-mating portion |
| 50-balance valve module |
| 52-first balance valve casing |
| 521-first fluid inlet |
| 522-first balance chamber |
| 523-first fluid outlet |
| 525-washer |
| 526-first check valve |
| 527-first sealing gasket |
| 528-first snap-fit projection |
| 529-mounting portion |
| 54-second balance valve casing |
| 541-second fluid inlet |
| 542-second balance chamber |
| 543-second fluid outlet |
| 544-second lateral opening |
| 545-washer |

-continued

List of Reference Numerals 546-second check valve
547-second sealing gasket
548-second snap-fit projection
549-mounting portion
56-outer balance valve spool
561-outer spool bore
562-annular groove
563-peripheral opening
565-O-ring
58-inner balance valve spool
581-first inner spool bore
582-second inner spool bore
583-peripheral opening
584-partition wall
60-ceramic spacer
601-first passage
602-second passage
603-first flange
604-second flange

We claim:

1. A fluid mixing valve for mixing a first fluid and a second fluid, comprising:
a housing;
a balance valve module for balancing pressure between the first fluid and the second fluid, comprising a first fluid inlet, a second fluid inlet, a first fluid outlet in fluid communication with the first fluid inlet, and a second fluid outlet in fluid communication with the second fluid inlet;
an adjustable valve module disposed on the balance valve module, comprising an inner casing member, a flow-rate adjustment seat secured to the inner casing member, and a temperature adjustment shaft received in the inner casing member; and
a mixed fluid discharging passage;
wherein the flow-rate adjustment seat comprises a first hole configured to be selectively in fluid communication with the first fluid outlet, and a second hole configured to be selectively in fluid communication with the second fluid outlet;
wherein the temperature adjustment shaft comprises an adjustable valve plate defining an adjustment aperture, and a mixing chamber in fluid communication with the mixed fluid discharging passage;
wherein the temperature adjustment shaft is configured to be operated to be rotated in relation to the inner casing member and the flow-rate adjustment seat so as to adjust a ratio of the first fluid to the second fluid flowing through the adjustment aperture;
wherein the inner casing member is configured to be operated to drive the flow-rate adjustment seat and the temperature adjustment shaft for rotation therewith in relation to the balance valve module so as to adjust a flow rate of the fluid from the first fluid outlet through the first hole and a flow rate of the fluid from the second fluid outlet through the second hole.

2. The fluid mixing valve according to claim 1, wherein the housing has a housing hole at a top thereof, from which the inner casing member is configured to extend out and has an inner casing hole at a top thereof, from which the temperature adjustment shaft is configured to extend out, and wherein the inner casing member at a portion extending out from the housing hole comprises a first mounting portion or a manipulation portion, and the temperature adjustment shaft at a portion extending out from the inner casing hole comprises a second mounting portion or a manipulation portion.

3. The fluid mixing valve according to claim 2, wherein the inner casing hole of the inner casing member defines a stop portion having a first stop surface and a second stop surface, and a limit groove, and wherein the temperature adjustment shaft comprises a protruding block configured to be movable within the limit groove between the first stop surface and the second stop surface.

4. The fluid mixing valve according to claim 2, wherein the housing at its inner side has a first stop portion and a second stop portion opposed to each other and the inner casing member at its outer side has a first stopper and a second stopper opposed to each other, and wherein the first and second stoppers are configured to be movable between the first stop portion and the second stop portion, respectively.

5. The fluid mixing valve according to claim 1, wherein the temperature adjustment shaft further comprises an upper valve plate spaced from the adjustable valve plate, and a lateral opening, and wherein the mixing chamber is defined between the adjustable valve plate and the upper valve plate, and wherein the lateral opening is configured to communicate the mixing chamber with the mixed fluid discharging passage.

6. The fluid mixing valve according to claim 5, wherein the adjustable valve plate is in the form of a separate component made of ceramic, and wherein one of the adjustable valve plate and the upper valve plate has a plurality of recesses, and from the other of the adjustable valve plate and the upper valve plate extend longitudinally a plurality of protrusions which are received in the respective recesses.

7. The fluid mixing valve according to claim 6, wherein the temperature adjustment shaft comprises a shaft body having a hollow inner chamber.

8. The fluid mixing valve according to claim 1, wherein the inner casing member comprises a snap-fit opening and the flow-rate adjustment seat comprises a snap-fit member or a tab for snap-fitting into the snap-fit opening.

9. The fluid mixing valve according to claim 1, wherein the flow-rate adjustment seat comprises a unitary ceramic flow-rate adjustment seat and the adjustable valve plate is configured to be directly supported on the flow-rate adjustment seat.

10. The fluid mixing valve according to claim 1, wherein arranged between the housing and the inner casing member is at least one first sealing element, and wherein the temperature adjustment shaft comprises at least one annular groove and at least one second sealing element is received in the annular groove and located between the temperature adjustment shaft and the inner casing member; and wherein the first sealing element is configured to apply friction force to the inner casing member to prevent the inner casing member from rotation, when the temperature adjustment shaft is rotated in relation to the inner casing member, and wherein the second sealing element is configured to apply friction force to the temperature adjustment shaft to allow the temperature adjustment shaft to be rotated along with the inner casing member, when the inner casing member is rotated in relation to the balance valve module.

11. The fluid mixing valve according to claim 1, wherein the adjustable valve plate defines a single adjustment aperture which has a generally arc shape and defines an intermediate portion, a first end and a second end, with the adjustment aperture being wider at the intermediate portion and tapering towards the first end and the second end, respectively.

12. The fluid mixing valve according to claim 1, wherein the balance valve module comprises:
   a first balance valve casing defining the first fluid inlet, the first fluid outlet, a first balance chamber between the first fluid inlet and the first fluid outlet, and a first lateral opening in communication with the first balance chamber;
   a second balance valve casing defining the second fluid inlet, the second fluid outlet, a second balance chamber between the second fluid inlet and the second fluid outlet, and a second lateral opening in communication with the second balance chamber and opposed to the first lateral opening;
   a valve spool subassembly arranged in the first and second lateral openings and comprising an outer balance valve spool having an outer spool bore and a peripheral opening, and an inner balance valve spool having a first inner spool bore, a second inner spool bore, a partition wall for separating the first and second inner spool bores from each other, and a peripheral opening;
   a first check valve arranged in the first fluid inlet; and
   a second check valve arranged in the second fluid inlet.

13. The fluid mixing valve according to claim 12, wherein the balance valve module further comprises a fastener for fastening the first balance valve casing and the second balance valve casing to each other, a first snap-fit projection positioned on the first balance valve casing, and a second snap-fit projection positioned on the second balance valve casing, and wherein the housing comprises a pair of hooks for snap-fitting to the first and second snap-fit projections.

14. The fluid mixing valve according to claim 1, further comprising a unitary ceramic spacer having a first passage, a second passage, a first flange surrounding the first passage and extending into the first fluid outlet, and a second flange surrounding the second passage and extending into the second fluid outlet.

15. A fluid mixing valve for mixing a first fluid and a second fluid, comprising:
   a housing;
   a balance valve module for balancing pressure between the first fluid and the second fluid, comprising a first fluid inlet, a second fluid inlet, a first fluid outlet in fluid communication with the first fluid inlet, and a second fluid outlet in fluid communication with the second fluid inlet;
   a first valve face located downstream of the balance valve module and comprising a first hole and a second hole, the first valve face being configured to be operated to be rotated in relation to the balance valve module so as to adjust a flow rate of the fluid from the first fluid outlet through the first hole and a flow rate of the fluid from the second fluid outlet through the second hole;
   a second valve face located downstream of the first valve face, the second valve face defining an adjustment aperture and being configured to be operated to rotated in relation to the first valve face so as to adjust a ratio of the first fluid to the second fluid flowing through the adjustment aperture;
   a mixing chamber located downstream of the second valve face;
   a mixed fluid discharging passage in fluid communication with the mixing chamber;
   a first friction generating means; and
   a second friction generating means;
   wherein the first friction generating means is configured to apply friction force to the first valve face so as to prevent the first valve face from rotation, when the second valve face is rotated in relation to the first valve face;
   wherein the second friction generating means is configured to apply friction force to the second valve face so as to allow the second valve face to rotate along with the first valve face, when the first valve face is rotated in relation to the balance valve module.

16. The fluid mixing valve according to claim 15, further comprising an adjustable valve module comprising a rotatably mounted inner casing member, a flow-rate adjustment seat secured to the inner casing member, and a temperature adjustment shaft rotatably received in the inner casing member; and wherein the flow-rate adjustment seat defines the first valve face and the temperature adjustment shaft defines the second valve face.

17. The fluid mixing valve according to claim 16, wherein the first friction generating means comprises at least one first sealing element arranged between the housing and the inner casing member, and the second friction generating means comprises at least one second sealing element arranged between the temperature adjustment shaft and the inner casing member.

* * * * *